United States Patent
Said et al.

(10) Patent No.: US 11,647,214 B2
(45) Date of Patent: May 9, 2023

(54) MULTIPLE TRANSFORMS ADJUSTMENT STAGES FOR VIDEO CODING

(71) Applicant: QUALCOMM Incorporated, San Diego, CA (US)

(72) Inventors: Amir Said, San Diego, CA (US); Hilmi Enes Egilmez, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 16/368,455

(22) Filed: Mar. 28, 2019

(65) Prior Publication Data

US 2019/0306522 A1 Oct. 3, 2019

Related U.S. Application Data

(60) Provisional application No. 62/650,953, filed on Mar. 30, 2018, provisional application No. 62/668,097, filed on May 7, 2018.

(51) Int. Cl.
*H04N 19/117* (2014.01)
*H04N 19/44* (2014.01)
(Continued)

(52) U.S. Cl.
CPC ............ *H04N 19/45* (2014.11); *G06F 17/16* (2013.01); *H04N 19/117* (2014.11);
(Continued)

(58) Field of Classification Search
CPC .... H04N 19/45; H04N 19/625; H04N 19/176; H04N 19/96; G06F 17/16
See application file for complete search history.

(56) References Cited

U.S. PATENT DOCUMENTS 5,347,305 A * 9/1994 Bush ...................... H04N 7/148
  348/14.01
5,867,416 A * 2/1999 Feldmann ............. G06F 30/367
  708/801

(Continued)

FOREIGN PATENT DOCUMENTS

WO 2010087807 A1 8/2010

OTHER PUBLICATIONS

Philippe P., "CE6: MTS simplification with TAF (tests 1.5a-d)", Joint Video Experts Team (JVET) of ITU-T SG 16 WP 3 and ISO/IEC JTC 1/SC 29/WG 11, JVET-M0080-v4, Jan. 9-18, 2019, 17 pages.

(Continued)

*Primary Examiner* — Shawn S An
(74) *Attorney, Agent, or Firm* — Shumaker & Sieffert, P.A.

(57) ABSTRACT

A device may perform a first prediction process for a first block of video data to produce a first residual. The device may apply a first transform process to the first residual to generate first transform coefficients for the first block of video data and encode the first transform coefficients. The device may perform a second prediction process for a second block of video data to produce a second residual. The device may determine that a second transform process, which includes the first transform process and at least one of a pre-adjustment operation or a post-adjustment operation, is to be applied to the second residual. The device may apply the first transform process and the pre- or post-adjustment operation to the second residual to generate second transform coefficients for the second block. The coding device may code the first and second transform coefficients.

28 Claims, 17 Drawing Sheets

(51) Int. Cl.

| | |
|---|---|
| *H04N 19/176* | (2014.01) |
| *H04N 19/625* | (2014.01) |
| *H04N 19/96* | (2014.01) |
| *G06F 17/16* | (2006.01) |
| *H04N 19/18* | (2014.01) |
| *H04N 19/463* | (2014.01) |
| *H04N 19/12* | (2014.01) |
| *H04N 19/61* | (2014.01) |
| *H04N 19/147* | (2014.01) |

(52) U.S. Cl.
CPC ............ *H04N 19/12* (2014.11); *H04N 19/147* (2014.11); *H04N 19/176* (2014.11); *H04N 19/18* (2014.11); *H04N 19/463* (2014.11); *H04N 19/61* (2014.11); *H04N 19/625* (2014.11); *H04N 19/96* (2014.11)

(56) References Cited

U.S. PATENT DOCUMENTS

| | | | | |
|---|---|---|---|---|
| 10,531,123 | B2* | 1/2020 | Kim | ............... H04N 19/122 |
| 2003/0206582 | A1* | 11/2003 | Srinivasan | ............... G06T 9/007 |
| | | | | 375/240.01 |
| 2008/0243971 | A1* | 10/2008 | Po | ............... H04N 19/107 |
| | | | | 708/4 |
| 2010/0312811 | A1* | 12/2010 | Reznik | ............... H04N 19/42 |
| | | | | 708/402 |
| 2010/0329352 | A1* | 12/2010 | DeCegama | ............... H04N 19/85 |
| | | | | 375/240.19 |
| 2011/0268183 | A1* | 11/2011 | Sole | ............... H04N 19/122 |
| | | | | 375/240.03 |
| 2012/0121167 | A1* | 5/2012 | Atoyan | ............... G06F 17/175 |
| | | | | 382/154 |
| 2014/0294086 | A1* | 10/2014 | Oh | ............... H04N 19/463 |
| | | | | 375/240.16 |
| 2016/0255371 | A1* | 9/2016 | Heo | ............... H04N 19/597 |
| | | | | 375/240.13 |
| 2017/0094313 | A1 | 3/2017 | Zhao et al. | |
| 2017/0238013 | A1 | 8/2017 | Said et al. | |
| 2018/0288439 | A1* | 10/2018 | Hsu | ............... H04N 19/12 |
| 2020/0186835 | A1 | 6/2020 | Said | |

OTHER PUBLICATIONS

Lorcy V., et al., "CE6: Further simplification of AMT with adjustment stages (Test CE6.1.6b)", JVET-L0135-v1, Joint Video Experts Team (JVET) of ITU-T SG 16 WP 3 and ISO/IEC JTC 1/SC 29/WG 11, Oct. 3-12, 2018, 8 pages.
Philippe P., et al., "CE6-Related: Further Simplification for AMT Complexity Reduction (CE6.1.2)", Joint Video Experts Team (JVET) of ITU-T SG 16 WP 3 and ISO/IEC JTC 1/SC 29/WG 11, JVET-K0000-v1, Jul. 10-18, 2018, 14 pages.
Said A., et al., "CE6.1.2: Efficient Implementations of AMT with Transform Adjustment Stages", Joint Video Experts Team (JVET) of ITU-T SG 16 WP 3 and ISO/IEC JTC 1/SC 29/WG 11, Jul. 10-18, 2018, JVET-K0272-v2, 6 pages.
Said A., et al., "CE6-1.4: Efficient Implementations of MTS with Transform Adjustments", Joint Video Experts Team (JVET) of ITU-T SG 16 WP 3 and ISO/IEC JTC 1/SC 29/WG 11, JVET-M0538-v2, Jan. 9-18, 2019, 26 pages.
Said A., et al., "CE6.1.6: Efficient Implementations of AMT with Transform Adjustment Filters (TAF)", Joint Video Experts Team (JVET) of ITU-T SG 16 WP 3 and ISO/IEC JTC 1/SC 29/WG 11, Oct. 3-12, 2018, JVET-L0386-v4, 8 pages.
Said A., et al., "CE6-Related: Efficient Computation of MTS Transform Combinations", Joint Video Experts Team (JVET) of ITU-T SG 16 WP 3 and ISO/IEC JTC 1/SC 29/WG 11, Jan. 9-18, 2019, JVET-M0539-v2, 6 pages.
Said A., et al., "Non-CE6: Efficient separable Multiple-Transform-Selection (MTS) without Zero-Out", Joint Video Experts Team (JVET) of ITU-T SG 16 WP 3 and ISO/IEC JTC 1/SC 29/WG 11, Mar. 19-27, 2019, JVET-N0485-v4, 14 pages.
Biatek T., et al., "Low-Complexity Adaptive Multiple Transforms for post-HEVC Video Coding," 2016 Picture Coding Symposium (PCS), IEEE, Dec. 4, 2016, XP033086858, DOI: 10.1109/PCS.2016.7906348 [retrieved on Apr. 19, 2017] Sections I, II, III; tables I-IV, pp. 1-5.
Bossen F., et al., "JEM Software Manual," Joint Collaborative Team on Video Coding (JCT-VC) of ITU-T SG16 WP3 and ISO/IEC JTC1/SC29/WG11, Document: JCTVC—Software Manual, Retrieved on Aug. 3, 2016, pp. 1-29.
Britanak V., et al., "Discrete Cosine and Sine Transforms: General Properties, Fast Algorithms and Integer Approximations," Academic Press, 2007, (Applicant points out, in accordance with MPEP 609.04(a), that the year of publication, 2007, is sufficiently earlier than the effective U.S. filing date, so that the particular month of publication is not in issue.) pp. 16-38.
Chen H., et al., "New Transforms Tightly Bounded by DCT and KLT," IEEE Signal Processing Letters, IEEE Service Center, Piscataway, NJ, US, vol. 19, No. 6, Jun. 1, 2012 (Jun. 1, 2012), pp. 344-347, XP011442399, ISSN: 1070-9908, DOI: 10.1109/LSP.2012.2195172, abstract, sections I.-III.
Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
Egilmez H.E., et al., "Row-Column Transforms: Low-complexity Approximation of Optimal Non-Separable Transforms," 2016 IEEE International Conference on Image Processing (ICIP), Sep. 2016, pp. 2385-2389.
Guerreiro R.F.C, et al., "Maximizing Compression Efficiency Through Block Rotation," Nov. 16, 2014 (Nov. 16, 2014), 4 Pages, XP055284160, Retrieved from the Internet: URL: http://arxiv.org/pdf/1411.4290v1.pdf the whole document.
Han J., et al., "Jointly Optimized Spatial Prediction and Block Transform for Video and Image Coding," IEEE Transactions on Image Processing, Apr. 2012, vol. 21, No. 4, pp. 1874-1884.
International Search Report and Written Opinion—PCT/US2019/024899—ISA/EPO—dated Jun. 18, 2019.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
Said A., et al.,"Complexity Reduction for Adaptive Multiple Transforms (AMTs) using Adjustment Stages," Joint Video Experts Team (JVET) of ITU-T SG 16 WP 3 and ISO/IEC JTC 1/SC 29/WG 11, 10th Meeting: San Diego, US, Apr. 10-20, 2018, JVET-J0066-v3, 15 pages.
Wien M, "High Efficiency Video Coding, Coding Tools and Specification," Chapter 5, 2015, (Applicant points out, in accordance with MPEP 609.04(a), that the year of publication, 2015, is sufficiently earlier than the effective U.S. filing date, so that the particular month of publication is not in issue), pp. 133-160.
Zhao X., et al., "Enhanced Multiple Transform for Video Coding," Data Compression Conference, Mar. 30, 2016, XP033027689, DOI: 10.1109/DCC.2016.9 [retrieved on Dec. 15, 2016], pp. 73-82.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v2, 10 pages.
ITU-T H.233, Series H: Audiovisual and Multimedia Systems, Infrastructure of audiovisual services—Transmission multiplexing and synchronization; Multiplexing protocol for low bit rate multimedia communication, The International Telecommunication Union. Jul. 2001, 74 pp.

\* cited by examiner

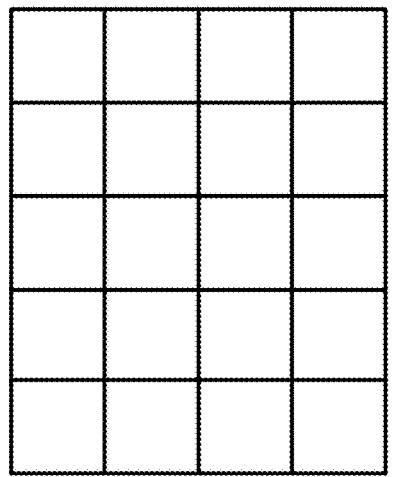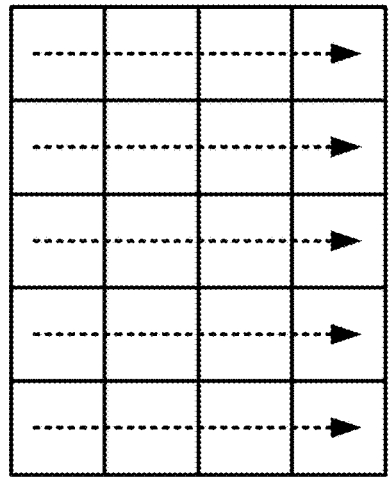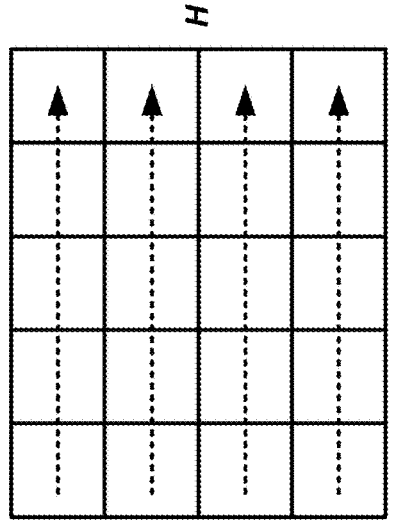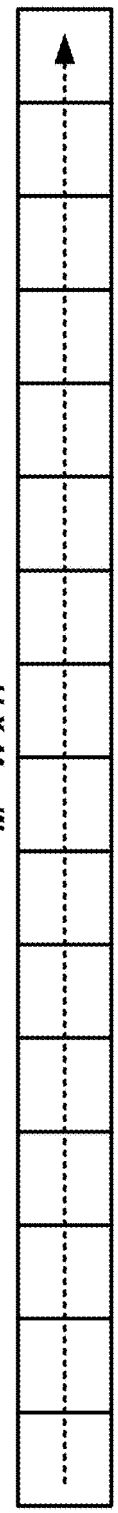

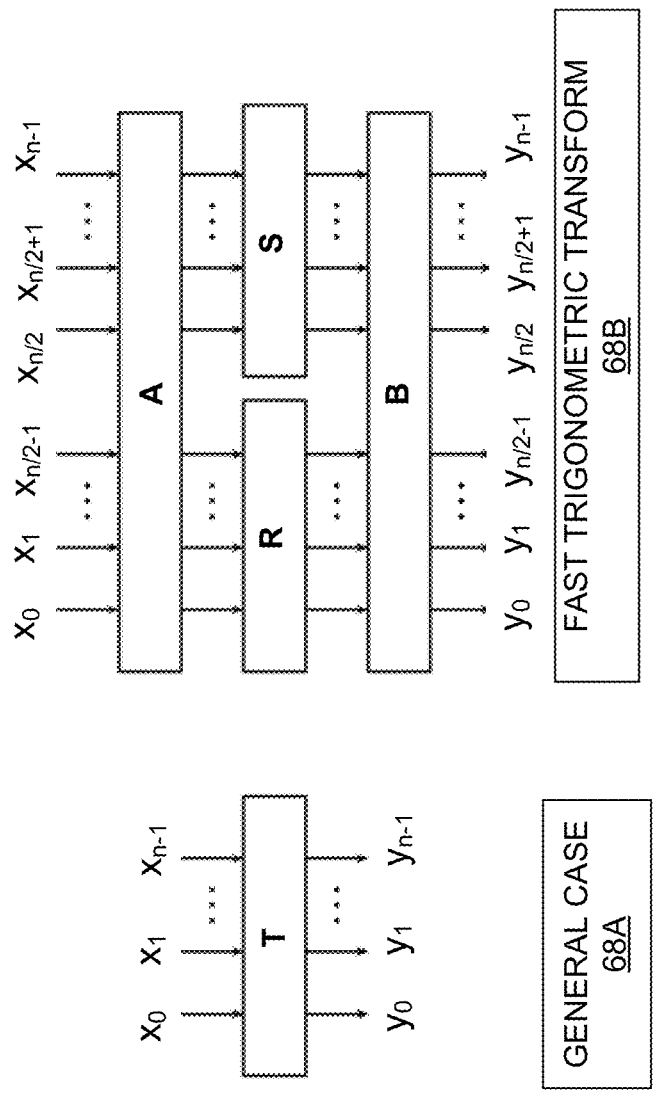

$t_m = \cos(\theta)r_m - \sin(\theta)r_n$
$t_n = \cos(\theta)r_n + \sin(\theta)r_m$ $r_m = \cos(\theta)t_m + \sin(\theta)t_n$
$r_n = -\sin(\theta)t_m + \cos(\theta)t_n$

MULTIPLE TRANSFORMS ADJUSTMENT STAGES FOR VIDEO CODING

This disclosure claims the benefit of U.S. Provisional Application No. 62/650,953, filed Mar. 30, 2018, and U.S. Provisional Application No. 62/668,097, filed May 7, 2018, with the entire content of each being incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In general, this disclosure describes techniques for reducing the amount of data stored in the memory of a video coder and increasing the computational efficiency for coding the video data with minimal reductions in the quality of the coded video data. In some examples, this disclosure describes techniques that use approximations to replace some complicated transform processes to achieve the memory reduction and computational efficiency benefits of this disclosure.

In one example, a video encoding device encodes video data for predicting a first residual for a first block of video data and a second residual for a second block of video data. For the first residual, the video encoding device determines that a first transform process is to be applied to the first residual and subsequently applies the first transform process to the first residual to generate first transform coefficients. For the second residual, the video encoding device determines that a second transform process is to be applied to the second residual. However, the second transform process, rather than being a different, complex transform process, may be the first transform process with the addition of at least one of a pre-adjustment operation or a post-adjustment operation. The video encoding device may then apply the combination of the first transform process and the pre- or post-adjustment process to the second residual to get second transform coefficients. The combination of the first transform process and the pre- or post-adjustment process approximates the second, different transform. The video encoding device may then code the first and second transform coefficients.

Similarly, when decoding the video data, the video decoding device may, for the first block, determine that a first inverse transform process is to be applied to the first block, and then subsequently apply the first inverse transform process to generate a first residual. The video decoding device may decode the first residual to produce a first decoded block. For the second block, the video decoding device may determine that a second inverse transform process is to be applied to the second residual, where second inverse transform process includes the first inverse transform process and at least one of a pre-adjustment operation or a post-adjustment operation, and then subsequently apply the combination of the first inverse transform process and the pre- or post-adjustment process to the second block to get a second residual. The video decoding device may decode the second residual to produce a second decoded block, and the decode the video data based at least in part on the first decoded block and the second decoded block.

In one example, the disclosure is directed to a method of encoding video data comprising performing a first prediction process for a first block of video data to produce a first residual; determining that a first transform process of a plurality of transform processes is to be applied to the first residual; applying the first transform process to the first residual to generate first transform coefficients for the first block of video data; encoding the first transform coefficients; performing a second prediction process for a second block of video data to produce a second residual; determining that a second transform process is to be applied to the second residual, wherein the second transform process comprises the first transform process and at least one of a first pre-adjustment operation or a first post-adjustment operation to apply to the second residual in addition to the first transform process; applying the first transform process and at least one of the first pre-adjustment operation or the first post-adjustment operation to the second residual to generate second transform coefficients for the second block of video data, wherein the first pre-adjustment operation, if applied, is applied prior to applying the first transform process, and wherein the first post-adjustment operation, if applied, is applied after applying the first transform process; and encoding the second transform coefficients.

In another example, the disclosure is directed to a video encoding device comprising: a memory configured to store video data; and one or more processors implemented in circuitry and configured to: perform a first prediction process for a first block of video data to produce a first residual; determine that a first transform process of a plurality of transform processes is to be applied to the first residual; apply the first transform process to the first residual to generate first transform coefficients for the first block of video data; encode the first transform coefficients; determine that a second transform process is to be applied to the second residual, wherein the second transform process comprises the first transform process and at least one of a first pre-adjustment operation or a first post-adjustment operation to apply to the second residual in addition to the first transform process; apply the first transform process and at least one of the first pre-adjustment operation or the first post-adjustment operation to the second residual to generate second transform coefficients for the second block of video data, wherein the first pre-adjustment operation, if applied, is applied prior to applying the first transform process, and wherein the first post-adjustment operation, if applied, is applied after applying the first transform process; and encode the second transform coefficients.

In another example, the disclosure is directed to a computer-readable storage medium having stored thereon instructions that, when executed, cause one or more processors of a video encoding device to: perform a first prediction process for a first block of video data to produce a first residual; determine that a first transform process of a plurality of transform processes is to be applied to the first residual; apply the first transform process to the first residual to generate first transform coefficients for the first block of video data; encode the first transform coefficients; perform a second prediction process for a second block of video data to produce a second residual; determine that a second transform process is to be applied to the second residual, wherein the second transform process comprises the first transform process and at least one of a first pre-adjustment operation or a first post-adjustment operation to apply to the second residual in addition to the first transform process; and apply the first transform process and at least one of the first pre-adjustment operation or the first post-adjustment operation to the second residual to generate second transform coefficients for the second block of video data, wherein the first pre-adjustment operation, if applied, is applied prior to applying the first transform process, and wherein the first post-adjustment operation, if applied, is applied after applying the first transform process; and encode the second transform coefficients.

In another example, the disclosure is directed to an apparatus for encoding video data, the apparatus comprising: means for performing a first prediction process for a first block of video data to produce a first residual; means for determining that a first transform process of a plurality of transform processes is to be applied to the first residual; means for applying the first transform process to the first residual to generate first transform coefficients for the first block of video data; means for encoding the first transform coefficients; means for determining that a second transform process is to be applied to the second residual, wherein the second transform process comprises the first transform process and at least one of a first pre-adjustment operation or a first post-adjustment operation to apply to the second residual in addition to the first transform process; means for applying the first transform process and at least one of the first pre-adjustment operation or the first post-adjustment operation to the second residual to generate second transform coefficients for the second block of video data, wherein the first pre-adjustment operation, if applied, is applied prior to applying the first transform process, and wherein the first post-adjustment operation, if applied, is applied after applying the first transform process; and means for encoding the second transform coefficients.

In another example, the disclosure is directed to a method of decoding video data comprising: determining that a first inverse transform process of a plurality of inverse transform processes is to be applied to a first block of a plurality of blocks of video data; applying the first inverse transform process to first transform coefficients of the first block to generate a first residual; decoding the first residual to produce a first decoded block; determining that a second inverse transform process is to be applied to a second block of the plurality of blocks of video data, wherein the second inverse transform process comprises the first inverse transform process and at least one of a pre-adjustment operation or a post-adjustment operation; applying the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process; decoding the second residual to produce a second decoded block; and decoding the video data based at least in part on the first decoded block and the second decoded block.

In another example, the disclosure is directed to a video decoding device comprising: a memory configured to store video data; and one or more processors implemented in circuitry and configured to: determine that a first inverse transform process of a plurality of inverse transform processes is to be applied to a first block of a plurality of blocks of video data; apply the first inverse transform process to first transform coefficients of the first block to generate a first residual; decode the first residual to produce a first decoded block; determine that a second inverse transform process is to be applied to a second block of the plurality of blocks of video data, wherein the second inverse transform process comprises the first inverse transform process and at least one of a pre-adjustment operation or a post-adjustment operation; apply the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process; decode the second residual to produce a second decoded block; and decode the video data based at least in part on the first decoded block and the second decoded block.

In another example, the disclosure is directed to a computer-readable storage medium having stored thereon instructions that, when executed, cause one or more processors of a video decoding device to: determine that a first inverse transform process of a plurality of inverse transform processes is to be applied to a first block of a plurality of blocks of video data; apply the first inverse transform process to first transform coefficients of the first block to generate a first residual; decode the first residual to produce a first decoded block; determine that a second inverse transform process is to be applied to a second block of the plurality of blocks of video data, wherein the second inverse transform process comprises the first inverse transform process and at least one of a pre-adjustment operation or a post-adjustment operation; apply the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process; decode the second residual to produce a second decoded block; and decode the video data based at least in part on the first decoded block and the second decoded block.

In another example, the disclosure is directed to an apparatus for decoding video data, the apparatus comprising: means for determining that a first inverse transform process of a plurality of inverse transform processes is to be applied to a first block of a plurality of blocks of video data; means for applying the first inverse transform process to first transform coefficients of the first block to generate a first residual; means for decoding the first residual to produce a first decoded block; means for determining that a second inverse transform process is to be applied to a second block of the plurality of blocks of video data, wherein the second inverse transform process comprises the first inverse transform process and at least one of a pre-adjustment operation or a post-adjustment operation; means for applying the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process; means for decoding the second residual to produce a second decoded block; and means for decoding the video data based at least in part on the first decoded block and the second decoded block.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3A is a conceptual diagram illustrating an example option for computing separable transforms in a two-dimensional block of pixel residuals.

FIG. 3B is a conceptual diagram illustrating an example option for computing non-separable transforms in a two-dimensional block of pixel residuals.

FIGS. 4A and 4B are conceptual diagrams illustrating example discrete trigonometric computations using matrix factorizations.

DETAILED DESCRIPTION

Figure 1:
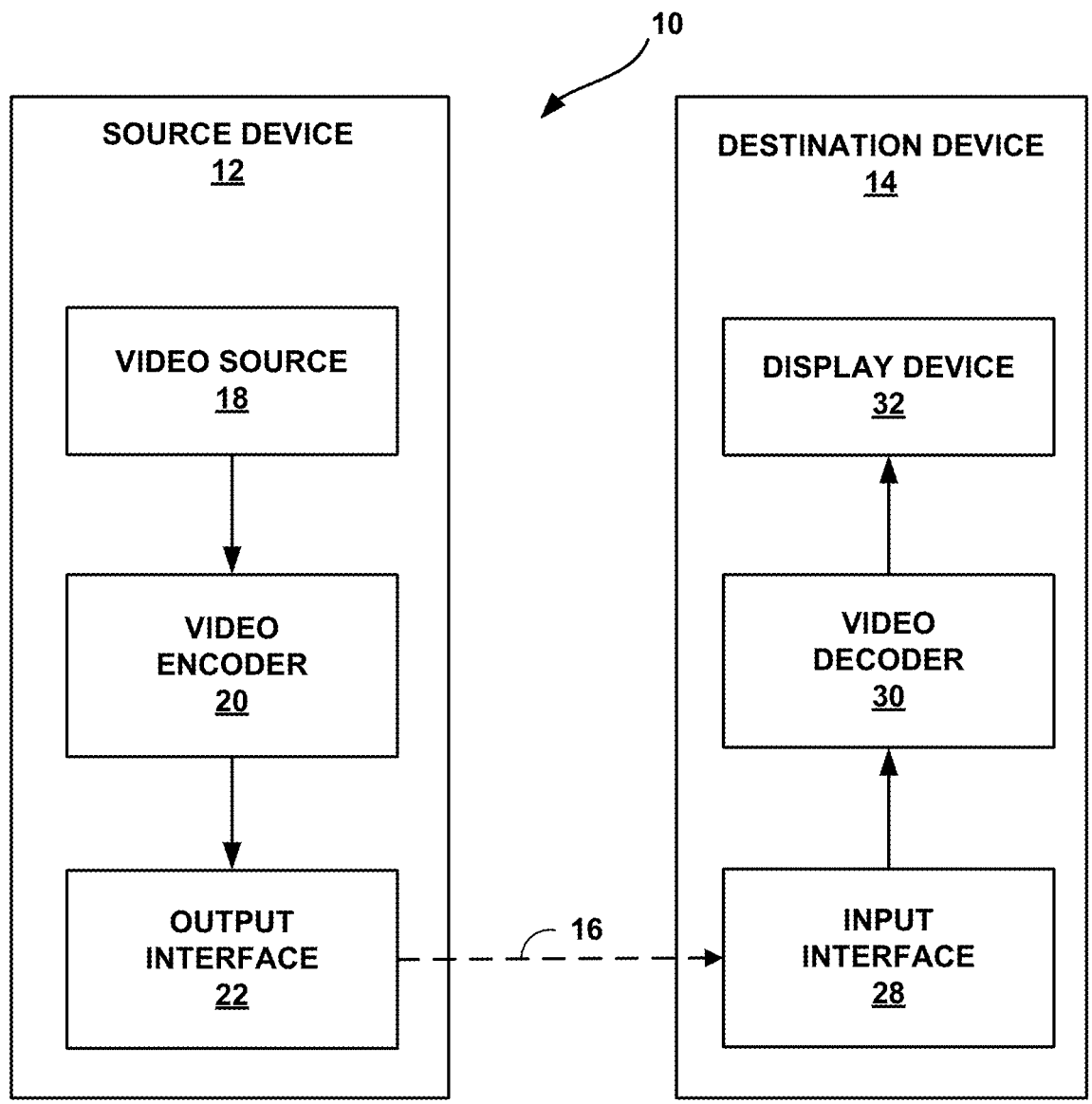
FIG. 1 is a block diagram illustrating an example video encoding and decoding system configured to implement techniques of the disclosure.

This disclosure describes techniques that may address problems with transform coding, which is a fundamental part of video compression standards. The techniques of this disclosure may reduce memory and computational complexity for large numbers of non-separable transforms, potentially enabling large coding gains with reasonable costs.

The techniques described herein may significantly reduce the computational complexity of the transforms that work best for video coding, both in terms of number of arithmetic operations, and the memory used to store the transform parameters, with little to no penalty in compression performance. The techniques of this disclosure may exploit those memory savings per transform, since the memory savings enable using a significantly larger number of transforms to improve coding gains. This disclosure describes how these techniques are to be used in practical video coding systems.

In accordance with the techniques described herein, rather than using one or more complex transformation processes, a video coder may add pre- or post-adjustment operations to a less complex transformation process to create a sequence of transforms that approximate the results of the one or more complex transformation processes. Although more processes may be applied in these techniques, by using fewer complex processes, the video blocks and the residual data may be processed more efficiently, especially when the blocks are larger than 8×8 in size. This is because the less complex processes may be applied much faster, exponentially in some instances. Further, the resulting video data may still be approximately equal in visual quality to what the resulting video data would be if the one or more complex transformation processes had been applied, resulting in more efficient processing without a loss in video quality.

Some example video coding standards use only one type of transform (Discrete Cosine Transform), but other standards, like HEVC, employ more than one type of transform to improve compression (see M. Wien, *High Efficiency*

Video Coding: Coding Tools and Specification, Springer-Verlag, Berlin, 2015, and J. Han, A. Saxena, V. Melkote, and K. Rose, "Jointly optimized spatial prediction and block transform for video and image coding," IEEE Trans. on Image Processing, pp. 1874-1884, vol. 21, April 2012, the entire contents of each which are incorporated herein by reference). In the Alliance for Open Media Video 1 (AV1) standard, and the latest International Telecommunication Union/Moving Pictures Expert Group (ITU/MPEG) standardization, this approach is further extended by allowing several types of Discrete Sine and Cosine Transforms (DSTs and DCTs). Employing multiple transforms may result in significant compression improvements (coding gains above 2%), but also creates several practical problems related to computational complexity, including (i) the amount of memory required to store the information about all the transforms, (ii) the unequal computation requirements for each transform, and (iii) resulting need for multiple implementation optimizations.

The techniques of this disclosure address some or all of the problems above by replacing the multiple transforms with pre-defined sets of low-complexity transforms, which may be combined with new computation structures (e.g., represented by sparse matrices and similar techniques) that allow efficient and sufficiently accurate approximation of the originally proposed transforms. Experimental simulations show that this approach can replace the five additional trigonometric transforms on the Joint Exploration Model (JEM) software with negligible coding losses, using only the well-known and highly optimized DCT type II, plus the new proposed approximation stages.

FIG. 1 is a block diagram illustrating an example video encoding and decoding system 10 configured to implement techniques of the disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 24. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 20 and video decoder 30 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable fixed-function and/or programmable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG). Alternatively, video encoder 20 and video decoder 30 may operate according to other proprietary or industry standards, such as the Joint Exploration Test Model (JEM) or ITU-T H.266, also referred to as Versatile Video Coding (VVC). The techniques of this disclosure, however, are not limited to any particular coding standard.

In HEVC and other video coding specifications, a video sequence typically includes a series of pictures. Pictures may also be referred to as "frames." A picture may include three sample arrays, denoted SL, Scb, and Scr. SL is a two-dimensional array (i.e., a block) of luma samples. Scb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks into one or more transform blocks. For instance, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

As another example, video encoder 20 and video decoder 30 may be configured to operate according to JEM or VVC. According to JEM or VVC, a video coder (such as video encoder 20) partitions a picture into a plurality of coding tree units (CTUs). Video encoder 20 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 20 and video decoder 30 may use a single QTBT structure to represent each of the luminance and chrominance components, while in other examples, video encoder 20 and video decoder 30 may use two or more QTBT structures, such as one QTBT structure for the luminance component and another QTBT structure for both chrominance components (or two QTBT structures for respective chrominance components).

Video encoder 20 and video decoder 30 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 20 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 20 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 20 may generate the prediction block using one or more motion vectors. Video encoder 20 may generally perform a motion search to identify a reference block that closely matches the CU, e.g., in terms of differences between the CU and the reference block. Video encoder 20 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 20 may predict the current CU using uni-directional prediction or bi-directional prediction.

JEM and VVC also provide an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. JEM and VVC provide sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Transform coding is a fundamental part of all modern video coding standards, like High-Efficiency Video Coding (HEVC). It is known that optimal transform coding should employ the matrix-based Karhunen-Loève Transforms (KLTs) (or similarly adaptive transforms), because such transforms can be optimized to particular signal statistics. However, the matrix implementation tends to require a relatively high number computations and a relatively high amount of memory. In practice, fixed separable transforms like the Discrete Cosine Transform (DCT) use fewer computations and less memory to implement the transform, and therefore, have been widely adopted.

In accordance with the techniques described herein, video encoder 20 may perform a first prediction process on a first block of video data and a second prediction process on a second block of video data to produce a first residual and a second residual, respectively. Video encoder 20 may, for the first residual, determine that a first transform process of a plurality of transform processes is to be applied to the first residual. Video encoder 20 may then apply the first transform process to the first residual to generate first transform coefficients for the first block of video data. For the second residual, video encoder 20 may determine that a second transform process is to be applied to the second residual, where the second transform process includes the first transform process and at least one of a pre-adjustment operation or a post-adjustment operation to apply to the second residual. Video encoder 20 may apply the first transform process and at least one of the pre-adjustment operation or the post-adjustment operation to the second residual to generate second transform coefficients for the second block of video data. If the pre-adjustment operation is applied, transform processing unit 252 applies the pre-adjustment operation prior to applying the first transform process. If the post-adjustment operation is applied, transform processing unit 252 applies the post-adjustment operation after applying the first transform process. By combining the first transform process and the pre- and/or post-adjustment operations, the second transform process can be an approximation of and a substitution for a more complex trigonometric transform without needing to perform the computationally heavy operations of the complex trigonometric transform and without having to store the full matrices in memory. Video encoder 20 may then proceed to entropy encode the first transform coefficients and the second transform coefficients.

Further in accordance with the techniques described herein, video decoder 30 may, for a first block of a plurality of blocks of video data, determine that a first inverse transform process of a plurality of inverse transform processes is to be applied to the first block. Video decoder 30 may then apply the first inverse transform process to first transform coefficients of the first block to generate a first residual. Video decoder 30 may decode the first residual to produce a first decoded block. For the second block, video decoder 30 may determine that a second inverse transform process is to be applied to the second block, where the first inverse transform process and at least one of a pre-adjustment operation or a post-adjustment operation. Video decoder 30 may apply the first inverse transform process and the at least one of the pre-adjustment operation or the post-adjustment operation to second transform coefficients of the second block to generate a second residual. If the pre-adjustment operation is applied, video decoder 30 applies the pre-adjustment operation prior to applying the first inverse transform process. If the post-adjustment operation is applied, video decoder 30 applies the post-adjustment operation after applying the first inverse transform process. Video decoder 30 may decode the second residual to produce a second decoded block. By combining the first transform process and the pre- and/or post-adjustment operations, this combination of operations can be an approximation of and a substitution for a more complex trigonometric transform without needing to perform the computationally heavy operations of the complex trigonometric transform and without having to store the full matrices in memory. Video decoder 30 may then proceed to decode the video data based at least in part on the first decoded block and the second decoded block.

Figure 2:
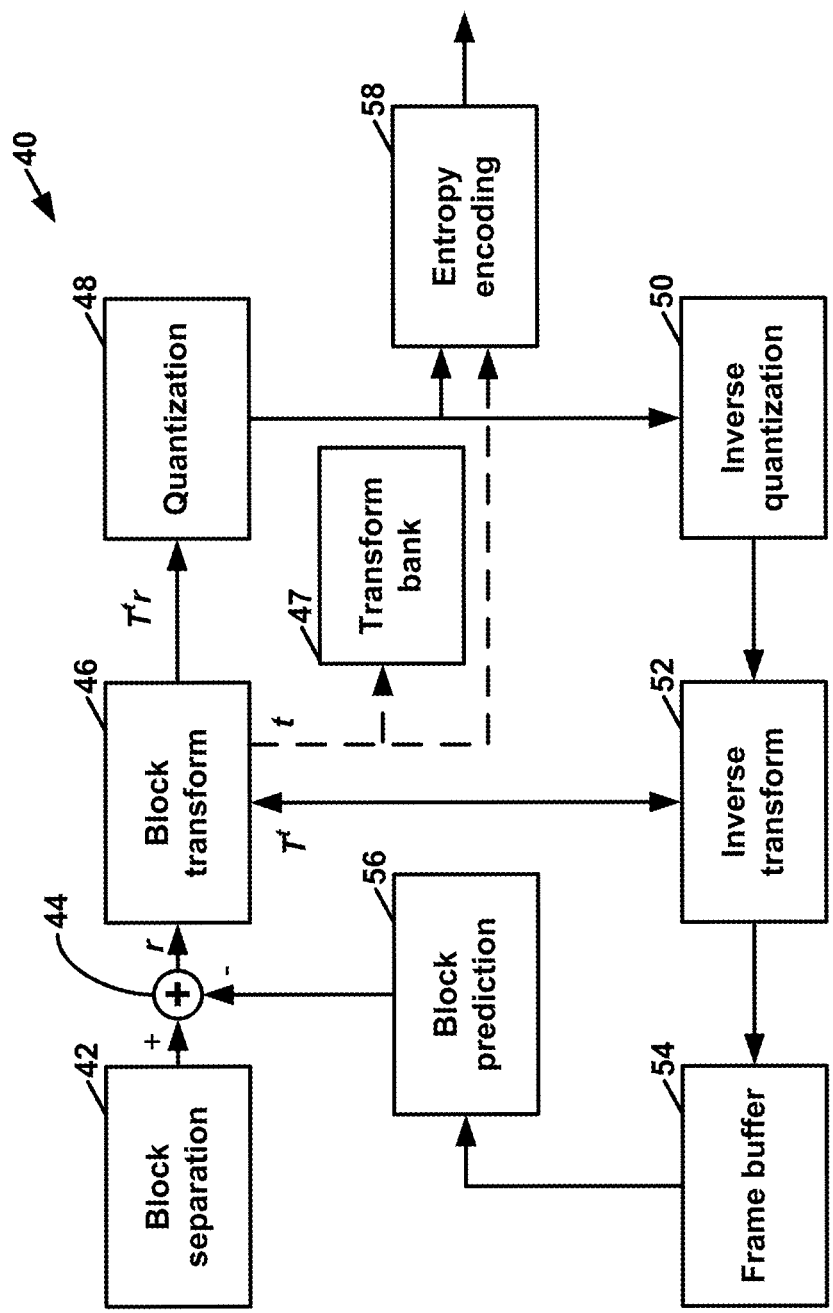
FIG. 2 is a block diagram illustrating an example system for hybrid video encoding with transform selection.

FIG. 2 is a block diagram illustrating an example system 40 for hybrid video encoding with transform selection. The techniques of this disclosure are applicable to the framework of adaptive transform coding shown in FIG. 2, where, for each block of prediction residuals, different transforms can be chosen by the encoder, and the choice of transform is encoded as side information.

FIG. 2 shows a diagram of a video encoding system 40 (i.e., an example video encoder, such as video encoder 20), where video frames are first divided into pixel blocks (block separation 42). Example types of pixel blocks may include coding blocks of CUs. Furthermore, in FIG. 2, for each block, video encoding system 40 subtracts each pixel value from its predicted value (44). The video encoder numerically transforms the blocks of differences (i.e., residuals) using a linear operation (block transform 46). In the example of FIG. 2, r denotes residual data, Pr denotes transformed residual data, and t denotes an indication of which transform was applied to the residual to generate Pr.

A linear transformation can be implemented by matrix-vector multiplications, but video coding applications have been using some special fast transforms that have fixed coefficients derived from trigonometric functions that can be computed much more efficiently than the equivalent matrix-vector products. However, in the context of this disclosure, it is important to note that the concept of computational efficiency has been changing with the advent of new hardware technologies. For instance, in some applications, decreasing the computation latency may be more important than reducing the number of arithmetic operations, which is the conventional measure of computational complexity.

In FIG. 2, the video encoder may quantize the transformed residual data (quantization 48) and inverse quantize (inverse quantization 50) the quantized transformed residual data. The video encoder may apply an inverse transform to the inverse quantized transformed residual data (inverse transform 52) to recover the residual data. A frame buffer 54, also called decoded picture buffer (DPB), of the video encoder stores reconstructed pixel blocks determined based on the residual data. The video encoder may use reconstructed pixel blocks stored in frame buffer 54 for prediction of other pixel blocks (block prediction 56). In the example of FIG. 2, the inverse transform applied to the transformed residual data by the video encoder may be determined based on the transform previously applied to generate the transformed residual data. The indication of which transform was applied to generate the transformed residual data may be provided to an entropy encoding unit 58 of the video encoder. The entropy encoding unit 58 may entropy encode a syntax element indicating the transform along with syntax elements indicating the quantized transformed residual data.

Older video coding standards used only one type of block transform. To improve compression, newer standards increasingly use multiple transforms. This is indicated in the diagram of FIG. 2 by the dashed line connecting block transform 46 with entropy coding 58 and transform bank 47, which represents the side information that the encoder uses to convey to the decoder which inverse transform is to be applied during decoding.

To reduce computational complexity, the block transforms are commonly computed in a separable manner, i.e., the horizontal and vertical lines of samples (e.g., luma and chroma samples) are transformed independently, as shown in FIGS. 3A and 3B. In an adaptive transform scheme, two possible choices for selecting different transforms, during a transform directional pass, may include a set of transforms done in the horizontal and vertical directions (horizontal and vertical transform passes, respectively).

FIGS. 3A and 3B show example options for applying transforms to a two-dimensional block of video residuals. FIG. 3A is a conceptual diagram illustrating an example option for computing separable transforms in a two-dimensional block of pixel residuals. FIG. 3B is a conceptual diagram illustrating an example option for computing non-separable transforms in a two-dimensional block of pixel residuals.

In the first option (e.g., FIG. 3A), called separable transforms, the residuals are transformed separately, first in rows and then in columns (or vice-versa), as indicated by the arrows in FIG. 3A. More specifically, for each respective row of an W×H input block 60, a video encoder/decoder (generically referred to as video coder) produces a row of an intermediate block 62 by multiplying a vector consisting of elements of the respective row by an W×H transform matrix. For each respective column of intermediate block 62, the video coder produces a column of an output block by multiplying a vector consisting of elements of the respective column by an W×H transform matrix. To reduce computational complexity the block transforms are commonly computed in a separable manner, i.e., the horizontal and vertical lines are transformed independently, as shown in FIG. 3A.

In the second type of block transformation (e.g., FIG. 3B), called non-separable transforms, all residuals are put together into a single vector, as shown in FIG. 3B, and are transformed together. This option does not exploit the two-dimensional structure of the pixel blocks, but this option is more general and powerful, and can exploit directional features different from horizontal and vertical. For instance, for an input block 64 consisting of W×H values, the transform matrix is W²×H². To determine an output block or vector 66, the video coder multiplies input block 64 by the transform matrix.

In some example video coding standards, separable fixed passes are used. In addition, the same transform is used for both the horizontal and the vertical transform passes. Separable fixed passes with different transforms in each pass were adopted in JEM in Joint Video Experts Team (JVET) of ITU-T SG 16 WP 3 and ISO/IEC JTC 1/SC 29/WG 11, JEM Software. Testing has shown that better compression can be obtained with separable variable passes. However, with separable variable passes, the coding process may have larger computational complexity.

To minimize the computational complexity, some example video coding standards use only one block size and one type of separable transform (the DCT). With the recent adoption of HEVC, separable transforms are defined for several block sizes, and the Discrete Sine Transform (DST) has been adopted.

Denoting the input and output vectors of the transform by N-dimensional vectors x and y, respectively, any linear transform of dimension N can be represented as $$y = Tx,$$

where T is an N×N transform matrix. Unless stated otherwise, in this disclosure, symbol N is used to denote the transform's dimension. To simplify the quantization process, transform matrices are normally derived from orthogonal matrices, i.e., those that satisfy $$T^{-1} = T^t.$$

In practice, the computations are done with a version of an orthogonal transform that has been scaled and has its elements converted to integers.

There are many sets of orthogonal transforms that can be defined by trigonometric functions, but one group became more widely known after it was demonstrated that the trigonometric functions were useful for media compression. Those Discrete Trigonometric Transforms (DTTs) are different types of Discrete Cosine Transform (DCT) and Discrete Sine Transform (DST), and both types are by convention numbered between 1 and 8. Two scaling functions may be used to construct the transforms:

$$a_N(n) = \begin{cases} \frac{1}{\sqrt{2}}, & \text{if } n = 0 \text{ or } n = N, \\ 1, & \text{otherwise}, \end{cases}$$

$$b_N(n) = \begin{cases} \frac{1}{\sqrt{2}}, & \text{if } n = N-1, \\ 1, & \text{otherwise}. \end{cases}$$

Using those scaling functions, the matrices defining the Discrete Cosine Transforms are:

$$T_{m,n}^{(C1)} = a_{N-1}(m) \cdot a_{N-1}(n) \cdot \sqrt{\frac{2}{N-1}} \cdot \cos\left(\frac{\pi \cdot m \cdot n}{N-1}\right), \quad \text{DCT-1}$$
$$m, n = 0, 1, 2, \cdots, N-1.$$

$$T_{m,n}^{(C2)} = a_N(m) \cdot \sqrt{\frac{2}{N}} \cdot \cos\left(\frac{\pi \cdot m \cdot \left[n+\frac{1}{2}\right]}{N}\right), \quad \text{DCT-2}$$
$$m, n = 0, 1, 2, \cdots, N-1.$$

$$T_{m,n}^{(C3)} = a_N(n) \cdot \sqrt{\frac{2}{N}} \cdot \cos\left(\frac{\pi \cdot [m+1/2] \cdot n}{N}\right), \quad \text{DCT-3}$$
$$m, n = 0, 1, 2, \cdots, N-1.$$

$$T_{m,n}^{(C4)} = \sqrt{\frac{2}{N}} \cdot \cos\left(\frac{\pi \cdot \left[m+\frac{1}{2}\right] \cdot \left[n+\frac{1}{2}\right]}{N}\right), \quad \text{DCT-4}$$
$$m, n = 0, 1, 2, \cdots, N-1.$$

$$T_{m,n}^{(C5)} = a_N(m) \cdot a_N(n) \cdot \sqrt{\frac{2}{N-\frac{1}{2}}} \cdot \cos\left(\frac{\pi \cdot m \cdot n}{N-\frac{1}{2}}\right), \quad \text{DCT-5}$$
$$m, n = 0, 1, 2, \cdots, N-1.$$

$$T_{m,n}^{(C6)} = a_N(m) \cdot b_N(n) \cdot \sqrt{\frac{2}{N-\frac{1}{2}}} \cdot \cos\left(\frac{\pi \cdot m \cdot \left[n+\frac{1}{2}\right]}{N-\frac{1}{2}}\right), \quad \text{DCT-6}$$
$$m, n = 0, 1, 2, \cdots, N-1.$$

$$T_{m,n}^{(C7)} = b_N(m) \cdot a_N(n) \cdot \sqrt{\frac{2}{N-\frac{1}{2}}} \cdot \cos\left(\frac{\pi \cdot \left[m+\frac{1}{2}\right] \cdot n}{N-\frac{1}{2}}\right), \quad \text{DCT-7}$$
$$m, n = 0, 1, 2, \cdots, N-1.$$

$$T_{m,n}^{(C8)} = \sqrt{\frac{2}{N-\frac{1}{2}}} \cdot \cos\left(\frac{\pi \cdot \left[m+\frac{1}{2}\right] \cdot \left[n+\frac{1}{2}\right]}{N+\frac{1}{2}}\right), \quad \text{DCT-8}$$
$$m, n = 0, 1, 2, \cdots, N-1.$$

Using the same scaling function $b_N(n)$ as used for DCT definitions, the matrices of the Discrete Sine Transforms are defined as:

$$T_{m,n}^{(S1)} = \sqrt{\frac{2}{N+1}} \cdot \sin\left(\frac{\pi \cdot [m+1] \cdot [n+1]}{N+1}\right), \quad \text{DST-1}$$
$$m, n = 0, 1, 2, \cdots, N-1.$$

$$T_{m,n}^{(S2)} = b_N(m) \cdot \sqrt{\frac{2}{N}} \cdot \sin\left(\frac{\pi \cdot [m+1] \cdot [n+1/2]}{N}\right), \quad \text{DST-2}$$
$$m, n = 0, 1, 2, \cdots, N-1.$$

$$T_{m,n}^{(S3)} = b_N(n) \cdot \sqrt{\frac{2}{N}} \cdot \sin\left(\frac{\pi \cdot [m+1/2] \cdot [n+1]}{N}\right), \quad \text{DST-3}$$
$$m, n = 0, 1, 2, \cdots, N-1.$$

$$T_{m,n}^{(S4)} = \sqrt{\frac{2}{N}} \cdot \sin\left(\frac{\pi \cdot [m+1/2] \cdot [n+1/2]}{N}\right), \quad \text{DST-4}$$
$$m, n = 0, 1, 2, \cdots, N-1.$$

$$T_{m,n}^{(S5)} = \sqrt{\frac{2}{N+\frac{1}{2}}} \cdot \sin\left(\frac{\pi \cdot [m+1] \cdot [n+1]}{N+\frac{1}{2}}\right), \quad \text{DST-5}$$
$$m, n = 0, 1, 2, \cdots, N-1.$$

-continued $$T_{m,n}^{(S6)} = \sqrt{\frac{2}{N+\frac{1}{2}}} \cdot \sin\left(\frac{\pi \cdot [m+1] \cdot [n+\frac{1}{2}]}{N+\frac{1}{2}}\right), \quad \text{DST-6}$$

$$m, n = 0, 1, 2, \cdots, N-1.$$

$$T_{m,n}^{(S7)} = \sqrt{\frac{2}{N+\frac{1}{2}}} \cdot \sin\left(\frac{\pi \cdot [m+\frac{1}{2}] \cdot [n+1]}{N+\frac{1}{2}}\right), \quad \text{DST-7}$$

$$m, n = 0, 1, 2, \cdots, N-1.$$

$$T_{m,n}^{(S8)} = b_N(m) \cdot b_N(n) \cdot \sqrt{\frac{2}{N-\frac{1}{2}}} \cdot \sin\left(\frac{[\pi+\frac{1}{2}] \cdot [m+\frac{1}{2}] \cdot n}{N-\frac{1}{2}}\right), \quad \text{DST-8}$$

$$m, n = 0, 1, 2, \cdots, N-1.$$

There are many mathematical properties connecting the sixteen Discrete Trigonometric Transforms listed above. Given a transform matrix T, some of the most important relationships are defined by matrix transposition, which correspond to the inverse transform. This is due to all Discrete Trigonometric Transforms being defined to be orthogonal. The "reflection" operations FTS and STF, show the orthogonal nature of the DTT matrices, where F and S are orthogonal involutory matrices defined by:

$$F_{m,n} = \begin{cases} 1, & \text{if } n = N - 1 - m, \\ 0, & \text{otherwise,} \end{cases}$$

$$S_{m,n} = \begin{cases} (-1)^m, & \text{if } n = m, \\ 0, & \text{otherwise.} \end{cases}$$

Table I contains a list of those relationships.

TABLE I

Relationships between Discrete Trigonometric Transforms that are defined by transposition and reflection transformations. $T^{(Ci)}$ and $T^{(Sj)}$ denote DCT-i and DST-j, respectively.

| T | $T^t$ | FTS | STF | $FT^tS$ | $ST^tF$ |
|---|---|---|---|---|---|
| $T^{(C1)}$ | $T^{(C1)}$ | $T^{(C1)}$ | $T^{(C1)}$ | $T^{(C1)}$ | $T^{(C1)}$ |
| $T^{(C2)}$ | $T^{(C3)}$ | $T^{(S2)}$ | $T^{(C2)}$ | $T^{(C3)}$ | $T^{(C3)}$ |
| $T^{(C3)}$ | $T^{(C2)}$ | $T^{(C3)}$ | $T^{(S3)}$ | $T^{(S2)}$ | $T^{(C2)}$ |
| $T^{(C4)}$ | $T^{(C4)}$ | $T^{(S4)}$ | $T^{(S4)}$ | $T^{(S4)}$ | $T^{(S4)}$ |
| $T^{(C5)}$ | $T^{(C5)}$ | $T^{(C7)}$ | $T^{(C6)}$ | $T^{(C7)}$ | $T^{(C6)}$ |
| $T^{(C6)}$ | $T^{(C7)}$ | $T^{(S8)}$ | $T^{(C5)}$ | $T^{(C5)}$ | $T^{(S8)}$ |
| $T^{(C7)}$ | $T^{(C6)}$ | $T^{(C5)}$ | $T^{(S8)}$ | $T^{(S8)}$ | $T^{(C5)}$ |

TABLE I-continued

Relationships between Discrete Trigonometric Transforms that are defined by transposition and reflection transformations. $T^{(Ci)}$ and $T^{(Sj)}$ denote DCT-i and DST-j, respectively.

| T | $T^t$ | FTS | STF | $FT^tS$ | $ST^tF$ |
|---|---|---|---|---|---|
| $T^{(C8)}$ | $T^{(C8)}$ | $T^{(S6)}$ | $T^{(S7)}$ | $T^{(S6)}$ | $T^{(S7)}$ |
| $T^{(S1)}$ | $T^{(S1)}$ | $T^{(S1)}$ | $T^{(S1)}$ | $T^{(S1)}$ | $T^{(S1)}$ |
| $T^{(S2)}$ | $T^{(S3)}$ | $T^{(C2)}$ | $T^{(S2)}$ | $T^{(S3)}$ | $T^{(C3)}$ |
| $T^{(S3)}$ | $T^{(S2)}$ | $T^{(S3)}$ | $T^{(C3)}$ | $T^{(C2)}$ | $T^{(S2)}$ |
| $T^{(S4)}$ | $T^{(S4)}$ | $T^{(C4)}$ | $T^{(C4)}$ | $T^{(C4)}$ | $T^{(C4)}$ |
| $T^{(S5)}$ | $T^{(S5)}$ | $T^{(S7)}$ | $T^{(S6)}$ | $T^{(S7)}$ | $T^{(S6)}$ |
| $T^{(S6)}$ | $T^{(S7)}$ | $T^{(C8)}$ | $T^{(S5)}$ | $T^{(S5)}$ | $T^{(C8)}$ |
| $T^{(S7)}$ | $T^{(S6)}$ | $T^{(S5)}$ | $T^{(C8)}$ | $T^{(C8)}$ | $T^{(S5)}$ |
| $T^{(S8)}$ | $T^{(S8)}$ | $T^{(C6)}$ | $T^{(C7)}$ | $T^{(C6)}$ | $T^{(C7)}$ |

The transposition and reflection transformations (or transform conversions) are useful in practice because the transformations represent operations that can be implemented with nearly negligible additional computational complexity and memory, and thus all transforms obtained by those transformations have practically the same computational complexity.

For instance, there are several methods for efficiently computing the DCT-2. Since the transforms DCT-3, DST-2, and DST-3 are all convertible to the DCT-2 by those transposition and reflection transformations (cf. Table I), each of these transforms can be computed efficiently using the same equally efficient methods. The techniques described herein exploit this fact.

In some instances, such as the general case 68A example of FIG. 4A, a single transformation matrix, such as any of the DTT transformations, may be applied to the video data (e.g., either the transform coefficients in the decoding process or the residuals of the encoding process).

Since linear transforms can be represented as a matrix-vector product, the maximum computational complexity of a Discrete Trigonometric Transform (number of operations per computation, and memory for its representation) is proportional to $N^2$.

Due to their similarity to the Discrete Fourier Transform (DFT), those transforms may be computed efficiently using Fast-Fourier-Transform (FFT) algorithms with complexity proportional to N×F, where F depends on the prime factorization of N or N−1. For example, if N=2K then F=K, and the complexity is proportional to $N \log_2 N$, which is commonly much lower than $N^2$. Since the complexity can vary significantly for different values of N, the cases $N=2^K$ are commonly chosen in compression applications.

Several alternative fast methods have been proposed for DTTs that use their specific properties, but these alternatives also have large variations in complexity because, as shown in Table II, the factor that defines complexity is not equal to N for all DTTs.

TABLE II

Factors defining complexity in Discrete Trigonometric Transforms.

| | DTT | | | | | | | |
|---|---|---|---|---|---|---|---|---|
| | DCT-1 | DCT-2 | DCT-3 | DCT-4 | DCT-5 | DCT-6 | DCT-7 | DCT-8 |
| DFT factor | N − 1 | N | N | N | 2N − 1 | 2N − 1 | 2N − 1 | 2N + 1 |

| | DTT | | | | | | | |
|---|---|---|---|---|---|---|---|---|
| | DST-1 | DST-2 | DST-3 | DST-4 | DST-5 | DST-6 | DST-7 | DST-8 |
| DFT factor | N + 1 | N | N | N | 2N + 1 | 2N + 1 | 2N + 1 | 2N − 1 |

Several efficient transform computation algorithms are based on the factorization of the transform matrices into sparse factors. The focus of the techniques described herein is based on an exploitation of the fact that, when N is even, the matrices of DCT-1, DCT-2, DST-1, and DCT-2 have even-numbered rows with elements that have even symmetry, and the odd-numbered rows have elements with odd symmetry.

Those symmetries allow the transform to be computed with about half the complexity using the scheme 68B shown on FIG. 4B, where A and B are pre/post processing low complexity transforms, while R and S are N/2×N/2 matrices.

One feature of some DTTs is that this factorization enables further complexity reductions. For instance, for the DCT-2, Matrix R corresponds to the DCT-2 of dimension N/2. Thus, the subdivision process can be continued in a recursive manner, further reducing computational complexity. Further, Matrix S corresponds to the DCT-4 of dimension N/2, which can also be computed efficiently. The DST-2 can be computed from the DCT-2 by simply changing matrices A and B. The DCT-3 and DST-3 can be computed from the DCT-2 using a similar process, replacing matrix R with its transpose, and also changing matrices A and B.

To simplify this presentation, those features may not be explicitly mentioned, but those features should be implicitly considered in FIG. 4B, and other similar diagrams referring to "fast trigonometric transforms."

Adaptive Multiple Transforms (AMT), which is used in one example of the JEM (Joint Experimental Model) of the ITU/MPEG JVET standardization, employs trigonometric transforms. The AMT coding method employs the following trigonometric transforms: DCT-2 (encoder only), DCT-3 (decoder only, is the inverse of DCT-2), DCT-5, DCT-8, DST-1, DST-6 (decoder only, is the inverse of DST-7), and DST-7 (encoder only).

Current computational resources may be able to process multiple transforms when $N \leq 8$, but increasingly larger blocks are being used for video coding. It is possible that the new standard may require transforms for block dimensions equal to 64, or maybe even as large as 128.

For a custom hardware implementation, transformations with different forms of complexity reduction techniques may require separate hardware designs for each case. Hardware and development costs are also heavily dependent on the most complex case (i.e., the worst-case scenario), and not the average complexity. It is advantageous to have a unified approach for transformation computations by enabling a single optimized implementation.

Some proposed AMT methods for JEM violates all of the above requirements, since some example AMT methods have different transforms with quite different minimum computational requirements. The methods for minimizing computational complexity are different among transforms, and even for the same transform, for different transform dimensions. For some transforms and dimensions, no efficient computation method (better than direct matrix-vector computation) is known. This last problem is particularly significant for the larger transform dimensions, making the use of those transforms in large blocks prohibitively expensive.

One difficulty with the family of AMT methods is that AMT methods should address two conflicting objectives. A variety of transforms is desired to improve compression efficiency. For instance, higher diversity and better results can be obtained using the Karhunen-Loève Transform (KLT), but there are no approaches for drastically reducing the computational complexity of general transforms. The DTTs that can be computed with minimal computational complexity do not provide the variety needed to achieve maximum coding gains. Additional DTTs are employed under the consideration that at least some of them can be computed with complexity smaller than $N^2$.

The techniques of this disclosure may provide the same or nearly the same level of diversity provided by multiple DTTs, but with computational complexity comparable to the most efficient DTTs (for all transform types and dimensions). These techniques are based on the identification that the properties needed for providing more diversity, and minimizing the computational complexity, are not mutually exclusive. This happens because the coding gains are defined mostly by the first rows of the transform matrix, which should be similar to the first rows for the KLT matrix, while the other rows are less important. Mathematically this means that, if there is already a transform that can be computed with low complexity, some form of low-complexity "adjustments" may be made in a subspace of low dimensionality to obtain the variety of transforms needed to improve compression.

Figures 5A, 5B:
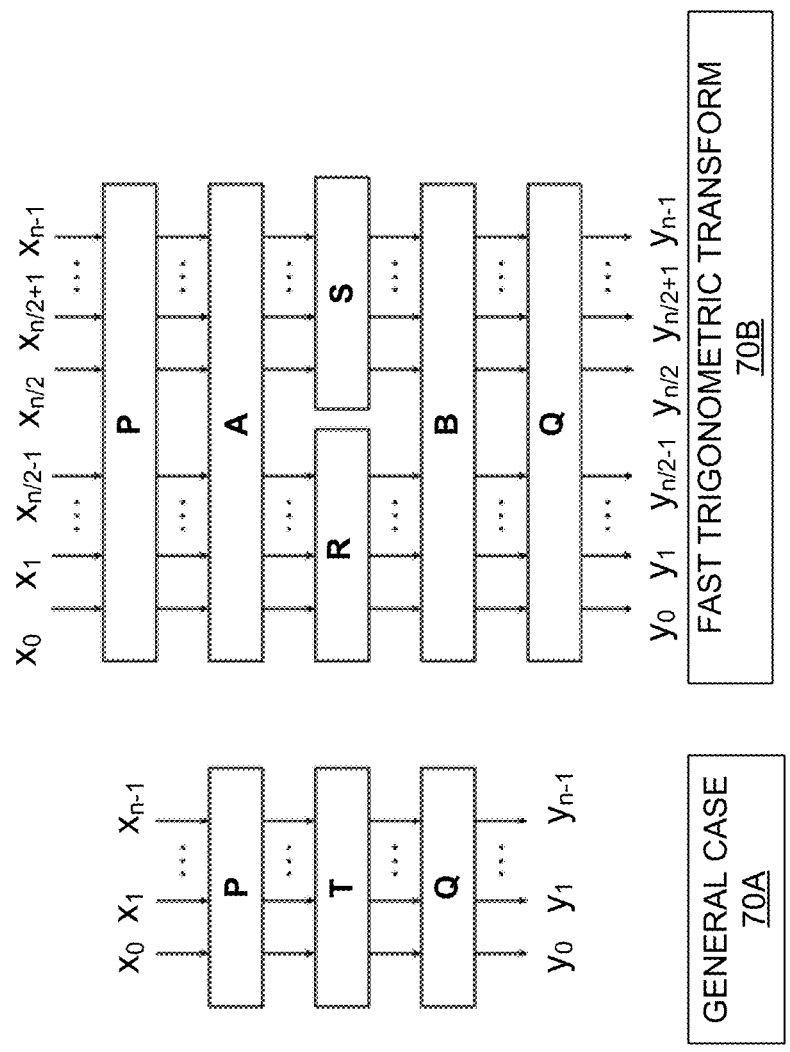
FIGS. 5A and 5B are conceptual diagrams illustrating example low-complexity transform adjustment stages in accordance with one or more techniques described herein.

FIGS. 5A and 5B are conceptual diagrams illustrating example low-complexity transform adjustment stages in accordance with one or more techniques described herein. FIG. 5A shows the general approach 70A where the optional pre-processing and post-processing stages, denoted by P and Q, "adjust" a transform that is defined by a matrix T, which can be computed with low complexity. This approach requires to define pre and post processing stages P and Q, which are called Low-Complexity Transform Adjustment Stages (LCTAS), also be computed with low complexity. The following sections define families of matrices that satisfy those requirements. A fast trigonometric transform example 70B is shown in FIG. 5B.

One observation is that the adjustment stages may be related to approximating other transforms, but the adjustment stages may not fit what is usually known as approximation. For example, to determine the adjustment stages that enable approximating the compression performance of the DST-7 using the DST-3, a transform is created that "adjusts" the DST-3 to be more similar to the DST-7. However, not all rows in the transform matrix need to be equally similar.

Figure 6A:
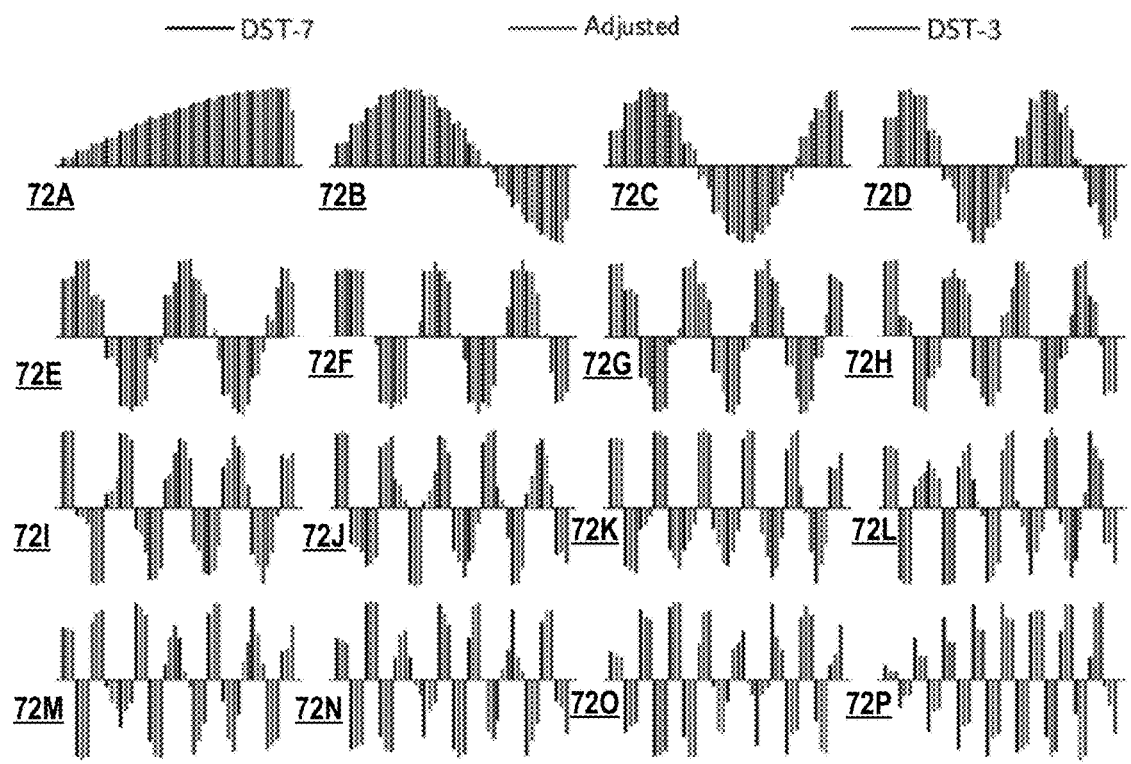
FIGS. 6A and 6B are conceptual diagrams illustrating comparisons between two different discrete sine transform matrices in accordance with one or more techniques described herein.
Figure 6B:
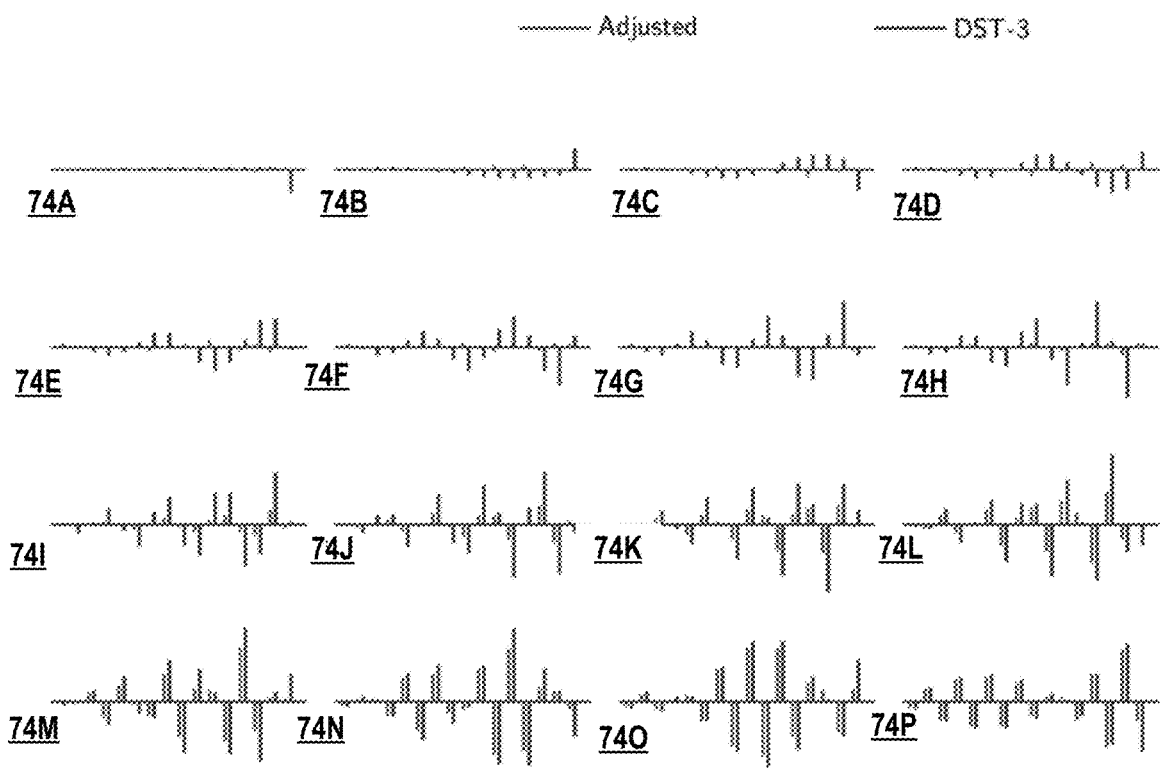

FIGS. 6A and 6B show actual results for this example, for transforms of dimension N=16. FIG. 6A shows plots 72A-72P with the rows of the matrices corresponding to each transform (DST-7, adjusted, and DST-3). For easier identification of the approximation errors, FIG. 6B shows the plots of matrix differences 74A-74P, where it can be observed that the first rows, corresponding to the most important transform components, are much better approximated than the last rows.

Figure 7B:
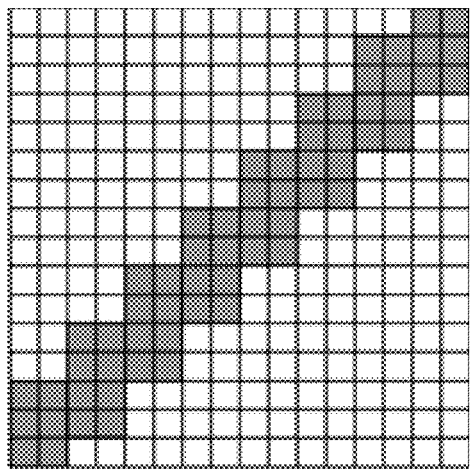
FIGS. 7A and 7B are conceptual diagrams illustrating example band diagonal and block diagonal sparse orthogonal matrices in accordance with one or more techniques described herein.
Figure 7A:
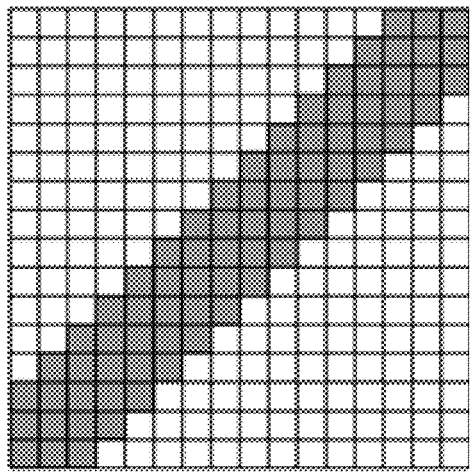

FIGS. 7A and 7B are conceptual diagrams 76A and 76B illustrating example band diagonal and block diagonal sparse orthogonal matrices in accordance with one or more techniques described herein. Matrix-vector products can be computed with relatively low-complexity if the matrix is known to be sparse (i.e., when most entries of the matrices are zeros). In general, any technique dealing with sparse matrices can be used. However, for video coding applications, in which the transforms matrices are not very large and computational costs are high, it is preferable to use matrices with pre-defined patterns of sparsity. This avoids additional memory used to represent the sparsity patterns, and requires simpler custom hardware designs.

Two useful types of sparse transforms are band matrices, which have nonzero elements only around the main diagonal, as shown in the examples of FIGS. 7A and 7B. For those cases, the computational complexity of the matrix-vector product is N×B, where B is the matrix band width, i.e., the upper bound on the number of non-zero elements in each row. The examples in FIGS. 7A and 7B were obtained with a matrix with band width equal to 4. The band structure of transform matrices is easy to explain, but in terms of computational complexity, any matrix that has a number of nonzero elements significantly smaller than $N^2$, in a fixed and easy to implement pattern that can be used for pre/post processing.

Figure 8:
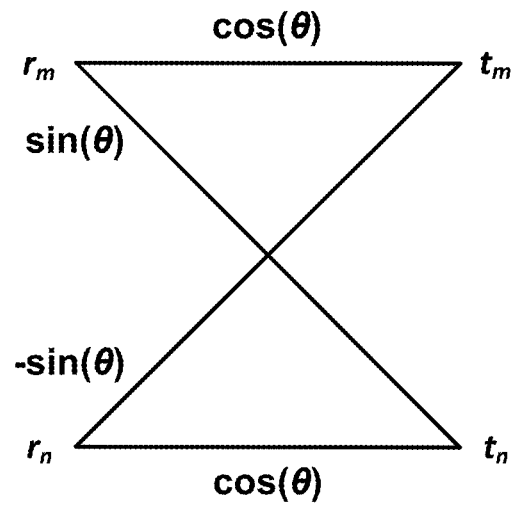
FIG. 8 is a conceptual "Butterfly" diagram representing a Givens orthogonal transformation in accordance with one or more techniques described herein.

FIG. 8 is a conceptual "Butterfly" diagram representing a Givens orthogonal transformation in accordance with one or more techniques described herein. Transform computations can also be minimized using matrices that have been factorized into sets of parallel Givens rotations. Those pairwise transformation have the structure shown in FIG. 8, and for that reason a commonly called computation "butterflies."

Thus, in the example of FIG. 8, the butterfly receives $r_n$ and $r_m$ as inputs and also receives a parameter θ as input. The outputs of the butterfly are $t_n$ and $t_m$. $t_m$ is calculated as $\cos(θ)r_m − \sin(θ)r_n$. $t_n$ is calculated as $\cos(θ)r_n + \sin(θ)r_m$. When applying an inverse transform, video decoder 30 may calculate $r_m$ as $t_m \cos(θ) + t_n \sin(θ)$ and $r_n$ as $−t_m \sin(θ) + t_n \cos(θ)$. Although FIG. 8, and other examples of this disclosure, are described with respect to Givens rotations, other transforms may be used instead of the Givens rotation, such as the Householder transformation, Euler rotations with 3 or more angles, and other transformations.

Figure 9:
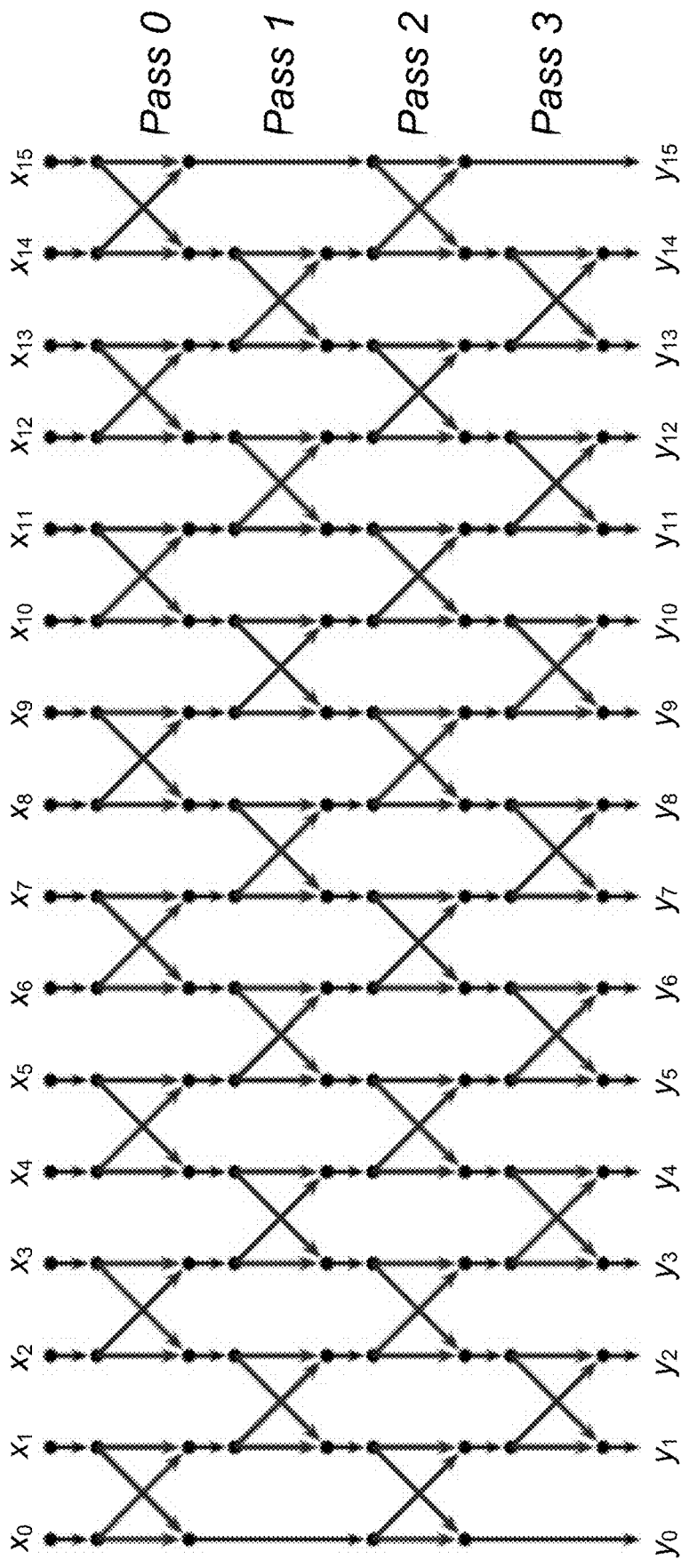
FIG. 9 is a conceptual diagram representing an example structure composed of parallel Givens rotations for transform adjustment in accordance with one or more techniques described herein.

FIG. 9 is a conceptual diagram representing an example structure composed of parallel Givens rotations for transform adjustment in accordance with one or more techniques described herein. In a transform of dimension N, up to N/2 rotations that can be computed in parallel, forming a parallel Givens pass. FIG. 9 shows an example of a transform of dimension N=16, implemented using four such passes. The configuration on FIG. 9 corresponds to band matrices, where the band width is equal to twice the number of passes. Similarly to the case of sparse matrices, any implementation that uses a number of rotations (butterflies) significantly smaller than $N^2$, can be used for adjustment.

Figure 10:
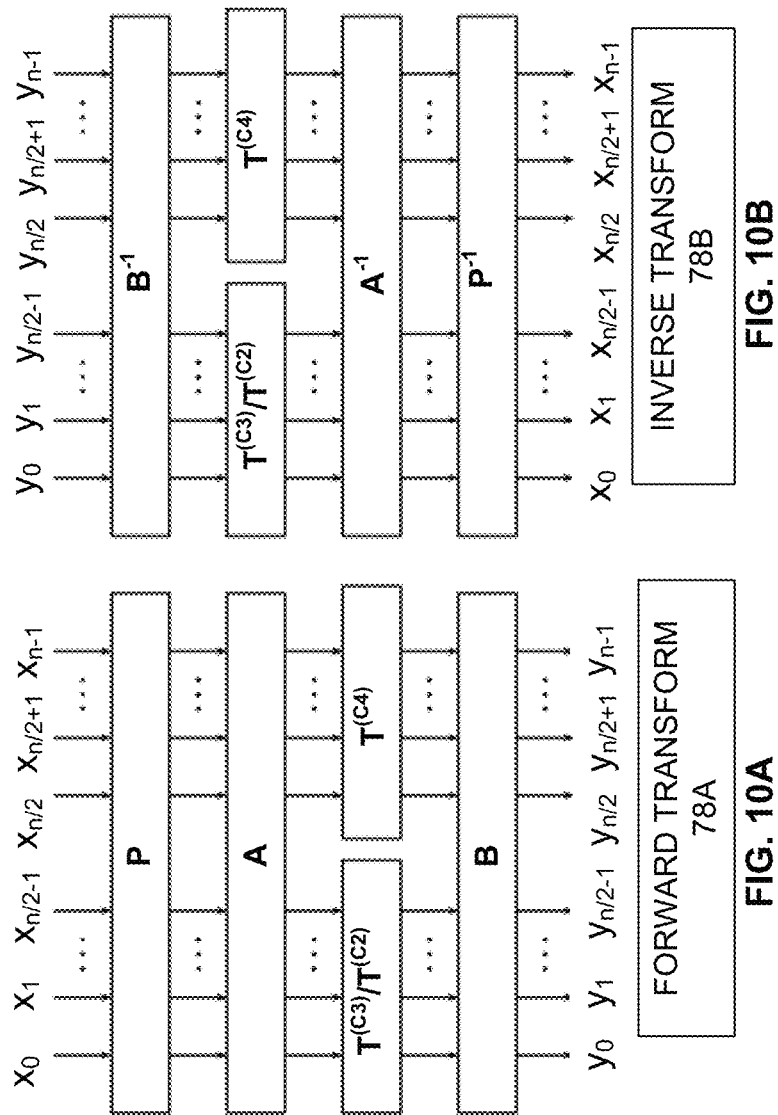
FIGS. 10A and 10B are conceptual diagrams representing an example replacement of multiple discrete trigonometric transforms with only the family of discrete cosine transformation 2 transforms and a low complexity adaptation state, in accordance with one or more techniques described herein.

FIGS. 10A and 10B are conceptual diagrams 78A and 78B representing an example replacement of multiple discrete trigonometric transforms with only the family of DCT-2 transforms and a low complexity adaptation state, in accordance with one or more techniques described herein. A more specific example of its application is its use for eliminating higher-complexity transforms in the AMT video coding method. For that purpose, it is advantageous to use the DCT-2, DCT-3, DST-2, and DST-3, since these specific DTT functions correspond to the same type of transform (cf. Table I), which has been the most extensively studied and have low-complexity implementations. Furthermore, as can be seen in Table II, their complexity factor is well-matched to the dimensions used for video coding.

Experimental results show that using only a pre-processing adjustment stage (e.g., post-adjustment matrix Q in FIGS. 5A and 5B not needed), all the remaining DTTs can be replaced with one of those transforms. Table III below shows which transform should be used (i.e., the "base" transform to be adjusted). FIGS. 10A and 10B shows how the techniques described herein can be used to replace the multiple DTTs in the AMT coding method, using only the family of DCT-2 transforms, plus an adjustment stage, which is an orthogonal band matrix. Experimental results show the techniques described herein to have very small loss when the number of non-zero elements in each row of the adjustment matrix P to be upper bounded by four.

TABLE III

Base transforms, chosen among DCT-2, DCT-3, DST-2, and DST-3, that can be used for replacing other Discrete Trigonometric Transforms.

| | DTT | | | | | |
|---|---|---|---|---|---|---|
| | DCT-1 | DCT-4 | DCT-5 | DCT-6 | DCT-7 | DCT-8 |
| Base | DCT-2 | DCT-3 | DCT-2 | DCT-2 | DCT-3 | DCT-3 |

| | DTT | | | | | |
|---|---|---|---|---|---|---|
| | DST-1 | DST-4 | DST-5 | DST-6 | DST-7 | DST-8 |
| Base | DST-2 | DST-3 | DST-2 | DST-2 | DST-3 | DST-3 |

Figure 11:
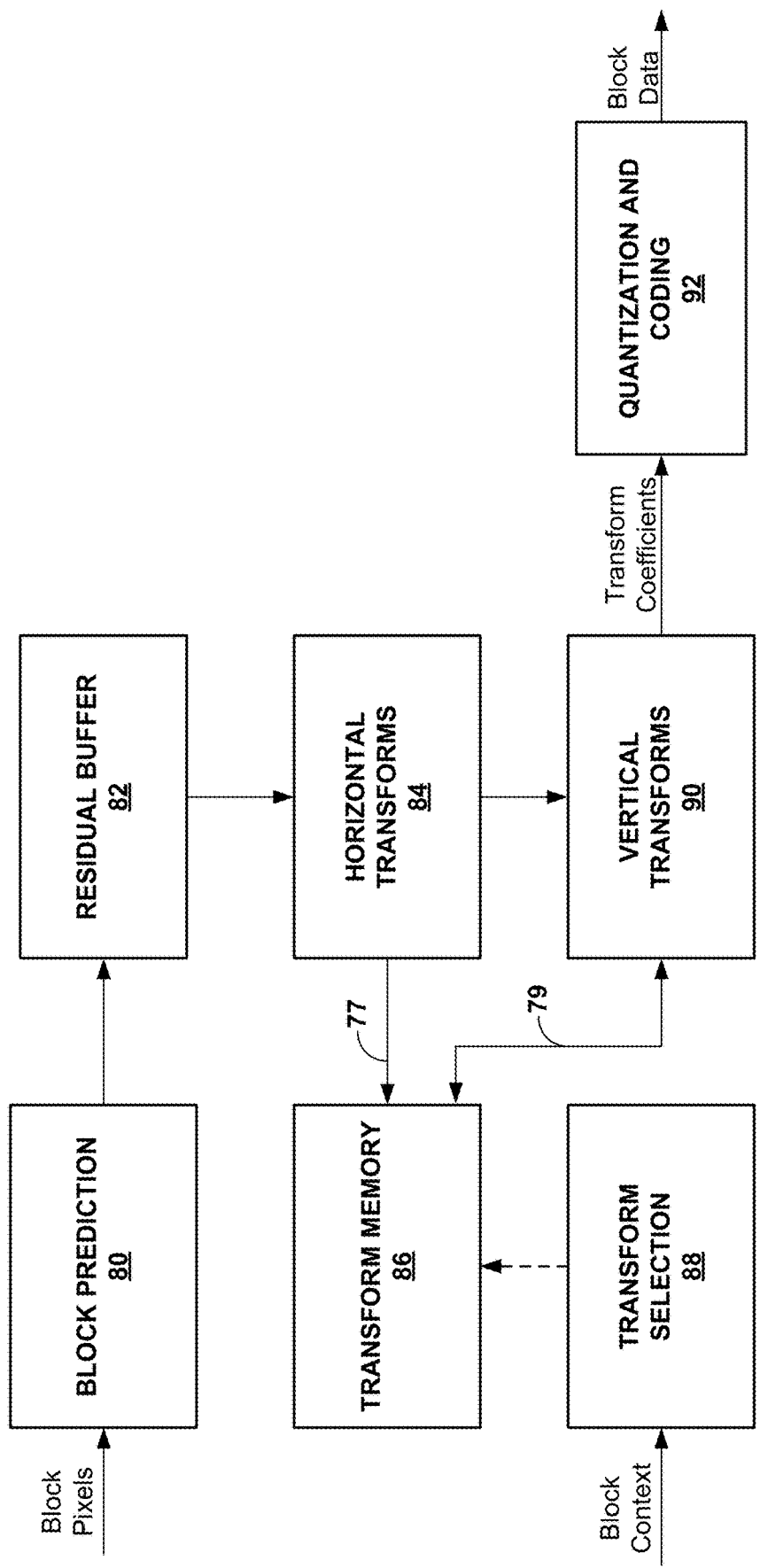
FIG. 11 is a block diagram showing an example system for computing separable transforms.

A system for implementing separable transforms is shown in FIG. 11, which a video encoder, such as video encoder 20, could operate. Video encoder 20 may use the various components shown in FIG. 11 during an encoding process, the components block prediction unit 80, residual buffer 82, horizontal transform unit 84, transform memory 86, transform selection 88, vertical transform unit 90, and quantization and coding unit 92. For comparing different transformation schemes, the computational complexity of each transform may be taken take into account the computational complexity of each transform. The computational complexity of a transform may depend on: (1) the amount of memory containing transform parameters, that may be accessed and copied, whenever a transform is computed (as indicated by lines 77 and 79 in FIG. 11); and/or (2) the number of operations needed to compute each transform, commonly normalized in operations per pixel.

These complexity measures depend on the type of transform employed, and the type of directional pass. Table IV shows a comparison of different cases. The first two rows correspond to a set of four Discrete Cosine and Sine Transforms (DCT, DST), containing the DCT-2 and DCT-3, and the DST-2 and DST-3. This set may be referred to as the DCT-2 "family" (since each transform can all be computed with basically the same algorithms for complexity reduction) and represent it as DCT-2F.

TABLE IV

Computational complexity of different separable transform computations, based on type of transform and directional pass, for a set of L transform of dimension N, and B as the band width of the sparse matrices used in the LCTAS method.

| Transform type | Directional pass type | Complexity | |
|---|---|---|---|
| | | Multiplications/pixel | Memory |
| DCT-2F | Fixed | $\log_2 N$ | $N \log_2 N$ |
| | Variable | $\log_2 N$ | $L N \log_2 N$ |
| Matrix | Fixed | $N$ | $N^2$ |
| | Variable | $N$ | $L N^2$ |
| LCTAS | Fixed | $B + \log_2 N$ | $N (B + \log_2 N)$ |
| | Variable | $B + \log_2 N$ | $N (L B + \log_2 N)$ |

The next two rows represent transforms computed directly using matrix-vector products. Due to the limitations of the DCT-2F transforms, this approach has been used in the adaptive transform methods, both for fixed directional passes, and for adaptive directional passes As shown in Table IV, there were previously only two conflicting options: (1) DCT-F2 transforms: computationally efficient, but very limited diversity, which strongly constrains coding gain. (2) Matrix-based transforms: can represent any type of linear transformation, and thus can result in significant coding gains, but with a computational complexity that grows quickly with block dimensions.

As shown in the next section, the techniques of this disclosure may greatly reduce this trade-off, allowing for a much more flexible set of transforms, with complexity slightly larger than that of DCT-2F.

The techniques described above for Low-Complexity Transform Adjustment Stages (LCTAS) enable video coding system 10 to employ adaptive transform coding, where one of the transforms of the DCT-2 family is employed for most of the transform computation, while the diversity that enables better compression is provided by low complexity computations, which may be referred to as transform adjustment stages.

In the following discussion, note that the complexity of the adjustment stages is low both in terms of arithmetic operations, and the memory used to store the parameters of the adjustment stages. One property of LCTAS that is particularly useful in the separable transform use case is that the adjustment stages can use the same DCT-2 family of transforms. The adjustment stages may use the same set of parameters, and therefore, only need some modifications that have very low complexity (e.g., few arithmetic operations, and no additional parameters).

The techniques of this disclosure are based on the identification that the properties needed for providing more diversity, and for minimizing the computational complexity, are not mutually exclusive. This happens because the coding gains are defined mostly by the first rows of the transform matrix, which should be similar to the first rows for the KLT matrix. The other rows of the transform matrix are less important in providing coding gains.

Mathematically, this means that, if a transform can be computed with low complexity, video encoder 20 and video decoder 30 may be configured with some form of low-complexity "adjustments" in a subspace of low dimensionality, to obtain a variety of transforms, which may then improve compression. As shown in Table IV above, assuming the bandwidth value B is relatively small compared to N (which generally holds because the matrices are sparse), the complexity of the LCTAS techniques of this disclosure is nearly the same as DCT-2F, while providing for greater flexibility. These techniques may therefore improve the functioning of computing devices, such as video encoders and decoders.

Figure 12:
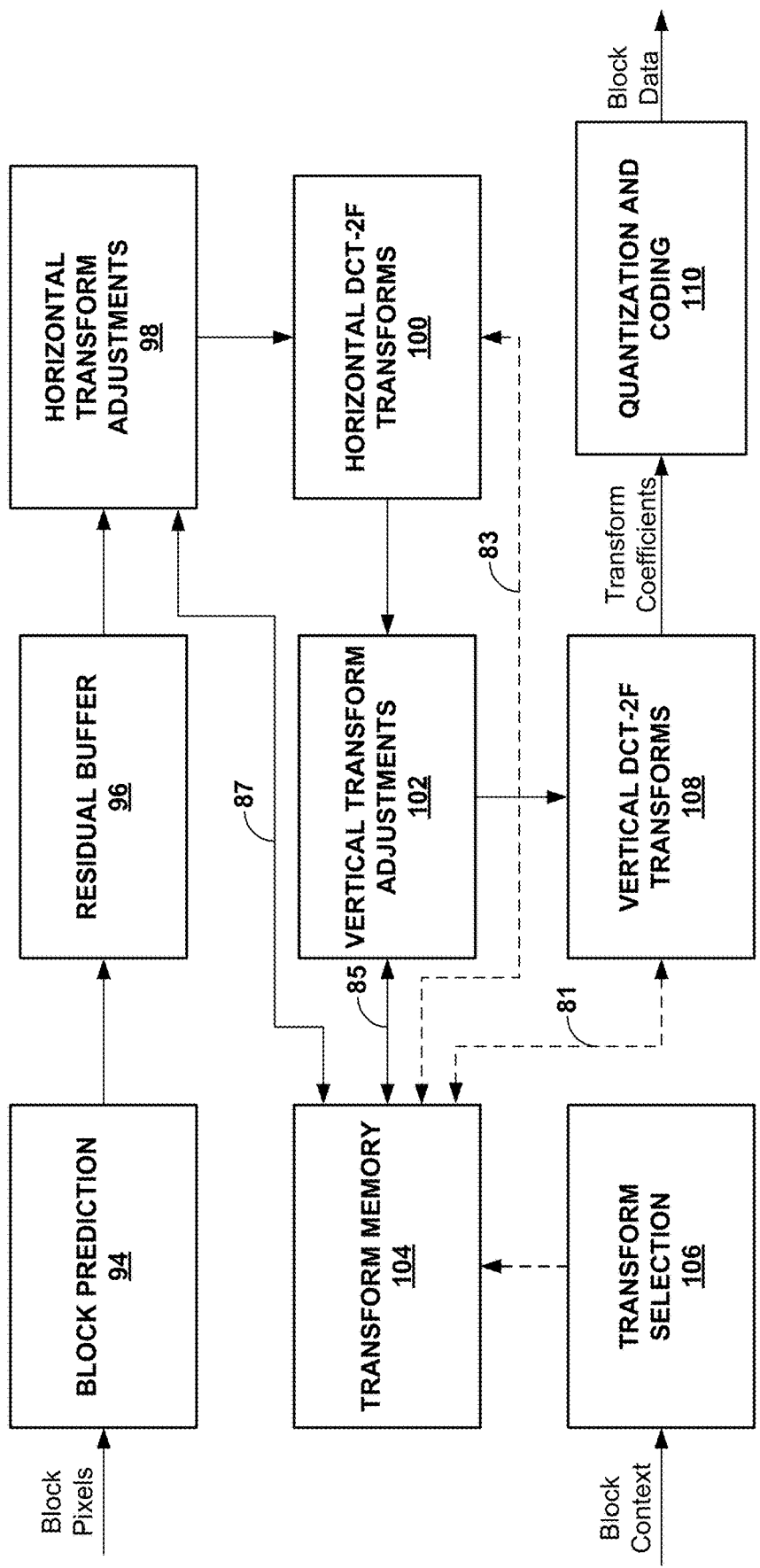
FIG. 12 is a block diagram showing an example system for computing separable transforms using low-complexity transform adjustment stages.

FIG. 12 shows a diagram with an implementation of the invention. In one example, video encoder 20 and video decoder 30 may be configured to perform the main computations using one of the transforms of the DCT-2 family. For instance, video encoder 20 may use the various components shown in FIG. 12 during an encoding process, the components including block prediction unit 94, residual buffer 96, horizontal transform adjustment unit 98, horizontal DCT-2F transform unit 100, vertical transform adjustment unit 102, transform memory 104, transform selection 106, vertical DCT-2F transform unit 108, and quantization and coding unit 110. As indicated by the dashed lines 81 and 83 in FIG. 12, a single signal (e.g., using 2 bits) may be used to select which of the forms of the DCT-2F is to be used, while only parameters of adjustment stages need to be copied from transform memory, as indicated by lines 85 and 87.

The complexity of this scheme is shown in the last two rows of Table IV above, where the LCTAS techniques of this disclosure provide diversity with significant reduction in memory access, compared to the full matrix schemes.

Figure 13A:
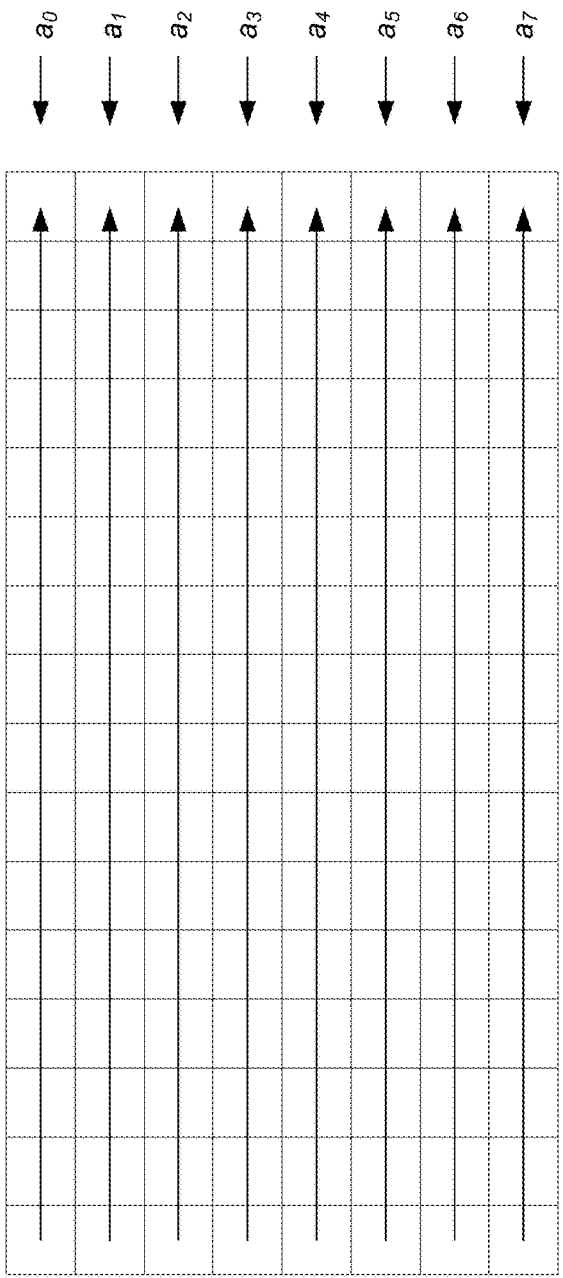
FIGS. 13A and 13B are conceptual diagrams showing examples of a horizontal pass of a separable transform.
Figure 13B:
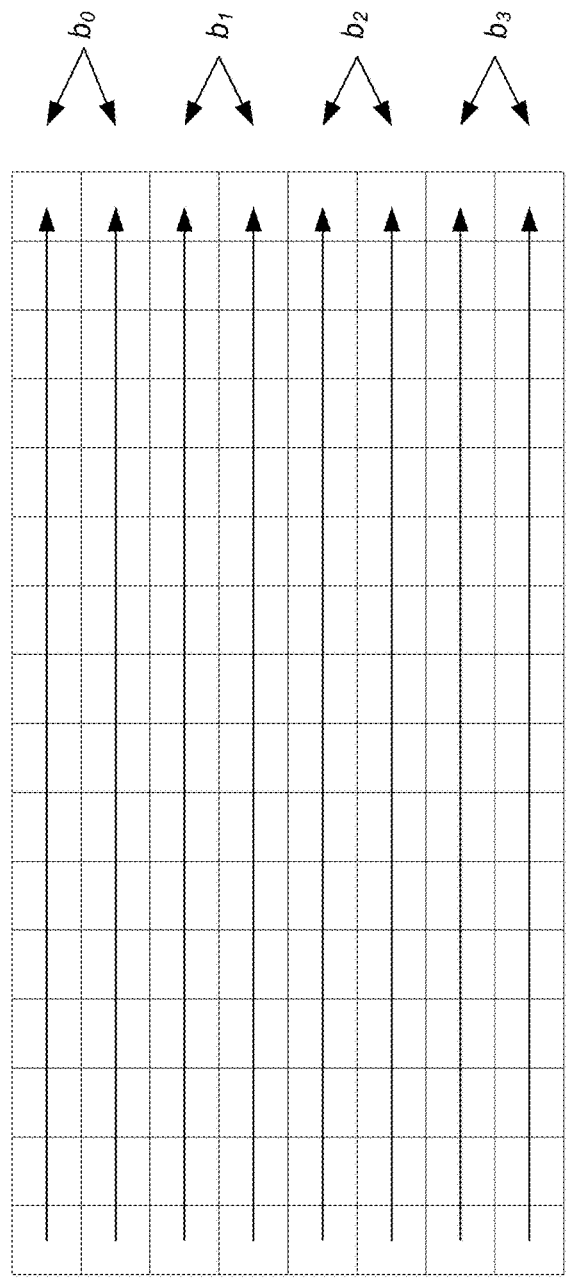

The techniques of this disclosure can be implemented in several ways. FIGS. 13A and 13B show examples of a horizontal pass of a separable transform, in a 16×8 block, showing variations on how different transform adjustment stages can be assigned to the block lines. For instance, FIG. 13A shows an example of different adjustments being used for each of the lines transformed in a block. FIG. 13B shows pairs of lines using the same adjustments, and thus reducing memory access by half. More general schemes can be employed, where the number of adjustments is defined for different situations.

For instance, a coding tree unit may include eight rows of coding units and eight columns of coding units (sixty-four coding units in total). In some examples, every coding unit in the coding tree unit undergoes the same transform process. In other examples, each row of coding units may undergo the same transform process but with different pre- and/or post-adjustment operations applied to each row and to each column (i.e., up to sixteen different combinations of transform process and adjustment) to produce higher quality video data after decoding at the expense of more data stored in memory. In still other examples, each pair of columns and pair of rows may undergo a different pre- and/or post-adjustment operation to provide a medium level of quality/memory compromise.

Figure 14:
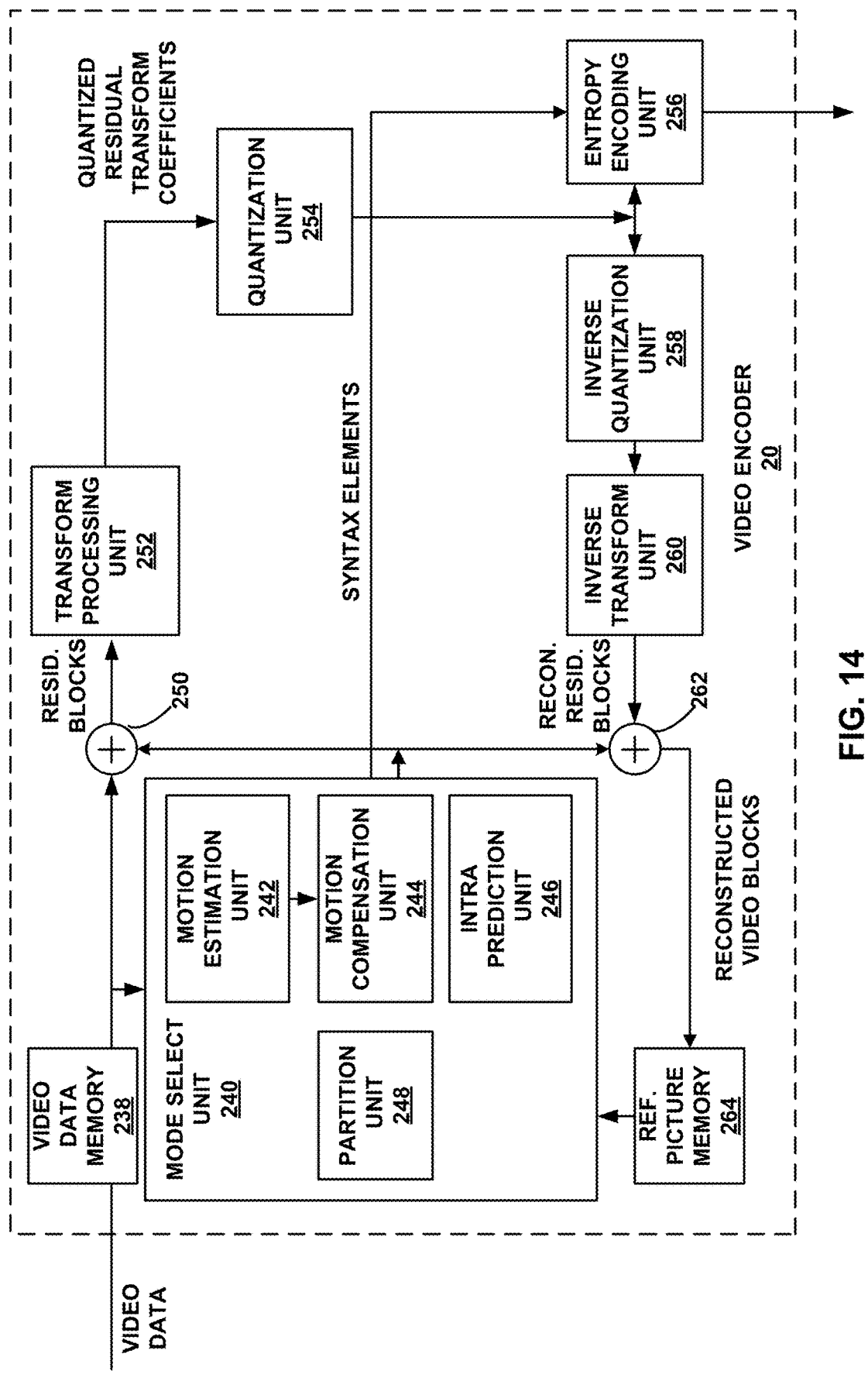
FIG. 14 is a block diagram illustrating an example of a video encoder configured to perform one or more of the techniques described herein.

FIG. 14 is a block diagram illustrating an example video encoder 20 that may implement the techniques of this disclosure. FIG. 11 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 11 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 14 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 14, video encoder 20 includes a mode select unit 240, a residual generation unit 250, a transform processing unit 252, a quantization unit 254, an inverse quantization unit 258, an inverse transform processing unit 260, a reconstruction unit 262, a filter unit 114, a reference picture memory 264, and an entropy encoding unit 256. Mode select unit 240 includes a motion estimation unit 242, motion compensation unit 244, partition unit 248, and an intra-prediction unit 246.

Video data memory 238 may be configured to store video data to be encoded by the components of video encoder 20. The video data stored in video data memory 238 may be obtained, for example, from video source 18. Reference picture memory 264 may be also be referred to as a decoded picture buffer. Reference picture memory 264 stores reference video data for use in encoding video data by video encoder 20, e.g., in intra- or inter-coding modes. Video data memory 238 and reference picture memory 264 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 238 and reference picture memory 264 may be provided by the same memory device or separate memory devices. In various examples, video data memory 238 may be on-chip with other components of video encoder 20, or off-chip relative to those components. Video data memory 238 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, mode select unit 240 may perform partitioning to divide the CTBs of the CTU into progressively-smaller blocks. The smaller blocks may be coding blocks of CUs. For example, mode select unit 240 may partition a CTB associated with a CTU according to a tree structure.

Video encoder 20 may encode CUs of a CTU to generate encoded representations of the CUs (i.e., coded CUs). As part of encoding a CU, partition unit 248 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Motion estimation unit 242 and motion compensation unit 244 may generate predictive data for a PU by performing inter prediction on each PU of a CU. The predictive data for the PU may include predictive blocks of the PU and motion information for the PU. Intra-prediction unit 246 may generate predictive data for a PU by performing intra prediction on the PU. The predictive data for the PU may include predictive blocks of the PU and various syntax elements. Intra-prediction unit 246 may perform intra prediction on PUs in I slices, P slices, and B slices.

To perform intra prediction on a PU, intra-prediction unit 246 may use multiple intra prediction modes to generate multiple sets of predictive data for the PU. Intra-prediction unit 246 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction unit 246 may use various numbers of intra prediction modes, e.g., 33 directional intra prediction modes. In some examples, the number of intra prediction modes may depend on the size of the region associated with the PU.

Mode select unit 240 may select the predictive data for PUs of a CU from among the predictive data generated by motion estimation unit 242 and motion compensation unit 244 for the PUs or the predictive data generated by intra-prediction unit 246 for the PUs. In some examples, mode select unit 240 selects the predictive data for the PUs of the CU based on rate/distortion metrics of the sets of predictive data. The predictive blocks of the selected predictive data may be referred to herein as the selected predictive blocks.

Residual generation unit 250 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 250 may generate the residual blocks of the CU such that each sample in the residual blocks has a value equal to a difference between a sample in a coding block of the CU and a corresponding sample in a corresponding selected predictive block of a PU of the CU.

Transform processing unit 252 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 252 may generate transform coefficient blocks for each TU of a CU by applying one or more transforms to the transform blocks of the TU. Transform processing unit 252 may apply various transforms to a transform block associated with a TU. For example, transform processing unit 252 may apply a discrete cosine transform (DCT), a directional transform, or a conceptually similar transform to a transform block. In some examples, transform processing unit 252 does not apply transforms to a transform block. In such examples, the transform block may be treated as a transform coefficient block.

In accordance with the techniques of this disclosure, transform processing unit 252 may implement the techniques described elsewhere in this disclosure. For example, after residual generation unit 250 performs a first prediction process on a first block of video data to produce a first residual, transform processing unit 252 may, for the first residual, determine that a first transform process of a plurality of transform processes is to be applied to the first residual. Transform processing unit 252 may then apply the first transform process to the first residual to generate first transform coefficients for the first block of video data. For instance, during the testing process, transform processing unit may determine that the DCT-2 transform is the optimal transform process to apply to the first residual, and, as such, may apply the DCT-2 transform to the first residual. In some instances, the first transform process is a discrete trigonometrical transform matrix. In some such instances, each transform process of the plurality of transform processes is a discrete trigonometrical transform matrix. In some instances, the first transform process is one of a DCT-2 matrix, a DCT-3 matrix, a DST-2 matrix, or a DST-3 matrix. Entropy encoding unit 256 may entropy encode the first transform coefficients.

After residual generation unit 250 performs a second prediction process on a second block of video data to produce a second residual, transform processing unit 252 may determine that a second transform process is to be applied to the second residual, where the second transform process is the first transform process and at least one of a first pre-adjustment operation or a first post-adjustment operation to apply to the second residual in addition to the first transform process. For instance, if every DTT were tested for the second residual, transform processing unit 252 may determine that the optimal transform process is the DCT-6 transform process. However, using the techniques described herein, the DCT-6 transform process may be closely approximated by applying the DCT-2 transform process with at least one of a pre-adjustment operation or a post-adjustment operation. As such, rather than store the DCT-6 matrix in memory and perform the complex DCT-6 transform in the testing phase, transform processing unit may instead test the combination of the DCT-2 transform process and the pre- and/or post-adjustment operation as a substitution. If this approximation of the DCT-6 is the optimal transform process for the second residual, transform processing unit 252 may select this combination as the second transform process. In essence, the second transform coefficients resulting from the application of the DCT-2 transform process and the pre- and/or post-adjustment operation would be approximately equal to transform coefficients resulting from applying the DCT-6 transform process to the second residual.

In some instances, the first transform process and the at least one of the pre-adjustment operation or the post-adjustment operation each are a respective sparse matrix, as defined above. In some examples, the sparse matrix of the first transform process is a band diagonal matrix. In other examples, the sparse matrix of the first transform process is a block diagonal matrix. In some other examples, the at least one of the pre-adjustment operation or the post-adjustment operation are a respective set of one or more Givens rotations.

Transform processing unit 252 may apply the first transform process and at least one of the first pre-adjustment operation or the first post-adjustment operation to the second residual to generate second transform coefficients for the second block of video data. If the first pre-adjustment operation is applied, transform processing unit 252 applies the first pre-adjustment operation prior to applying the first transform process. If the first post-adjustment operation is applied, transform processing unit 252 applies the first post-adjustment operation after applying the first transform process. Video encoder 20 may then proceed to encode the second transform coefficients, such as by entropy encoding the first transform coefficients and the second transform coefficients.

To describe an example of the testing process described above, a generic block is used in the below description. When determining that the first or second transform processes described above are to be applied, transform processing unit 252 may follow a similar process. After residual generation unit 250 predicts a residual for the block of video data. Transform processing unit 252 may determine a subset of transform processes from the plurality of transform processes that includes less transform processes than the plurality of transform processes. The subset of transform processes also includes the first transform process.

Transform processing unit 252 may also determine a set of adjustment operations, with each adjustment operation including at least one of a pre-adjustment operation or a post-adjustment operation to be applied to the residual being evaluated. When each adjustment operation is applied in conjunction with a transform process of the subset of transform processes, the resulting transform coefficients are approximately equal to transform coefficients that would have resulted from the application of a transform process in the plurality of transform processes that is not included in the subset of transform processes to the residual being evaluated. Each adjustment operation of the set of adjustment operations is associated with a particular transform process of the subset of transform processes. Some transform processes from the subset of transform processes can be associated with multiple adjustment operations.

Transform processing unit 252 may determine rate-distortion characteristics for each transform process of the subset of transform processes, as well as rate-distortion characteristics each adjustment operation and the adjustment operation's associated transform process. Based on these determined rate-distortion characteristics, transform processing unit 252 may select either the transform process from the subset of transform processes or the adjustment operation from the set of adjustment operations and the transform process from the subset of transform processes associated with the selected adjustment operation as a complete transform process to apply to the residual being evaluated. Transform processing unit 252 may apply the complete transform process to the residual being evaluated to generate transform coefficients for that block of video data and encode said transform coefficients.

In some examples, the transform processes may be implemented as separable fixed passes, meaning that the same transform is applied during all of the one-dimensional transformations, although the transforms may change between the vertical and horizontal passes. In such examples, the first block may be a first coding tree unit, and the second block may be a second, different coding tree unit.

In other examples, the transform processes may be implemented as separable variable passes, where each row (for horizontal passes) or column (for vertical passes) of coding units, or pairs of rows or columns, within a single coding tree unit may use different transforms. In such examples, the first block may be a first coding unit in a first row or column of a coding tree unit, and the second block may be a second coding unit in a different row or column of the same coding tree unit. In the example where pairs of rows/columns use the same transform process, residual generation unit 250 may perform a third prediction process for a third coding unit of the coding tree unit to produce a third residual, where the third coding unit is in a third row of the coding tree unit, and where the second row and the third row are contiguous rows. As such, transform processing unit 252 may determine that the second transform process is to be applied to the third residual and apply the second transform process to the third residual to generate third transform coefficients for the third coding unit. Transform processing unit 252 may then encode the third transform coefficients.

Quantization unit 254 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 254 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 258 and inverse transform processing unit 260 may apply inverse quantization and inverse transforms to a coefficient block, respectively, to reconstruct a residual block from the coefficient block. Inverse quantization may restore the bit depths of transform coefficients. Reconstruction unit 262 may add the reconstructed residual block to corresponding samples from one or more predictive blocks generated by mode select unit 240 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Reference picture memory 264 may store the reconstructed coding blocks after filter unit 114 performs the one or more deblocking operations on the reconstructed coding blocks. Motion estimation unit 242 and motion compensation unit 244 may use a reference picture that contains the reconstructed coding blocks to perform inter prediction on PUs of other pictures. In addition, intra-prediction unit 246 may use reconstructed coding blocks in reference picture memory 264 to perform intra prediction on other PUs in the same picture as the CU.

Entropy encoding unit 256 may receive data from other functional components of video encoder 20. For example, entropy encoding unit 256 may receive coefficient blocks from quantization unit 254 and may receive syntax elements from mode select unit 240. Entropy encoding unit 256 may perform one or more entropy encoding operations on the data to generate entropy-encoded data. For example, entropy encoding unit 256 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 256. For instance, the bitstream may include data that represents a RQT for a CU.

Figure 15:
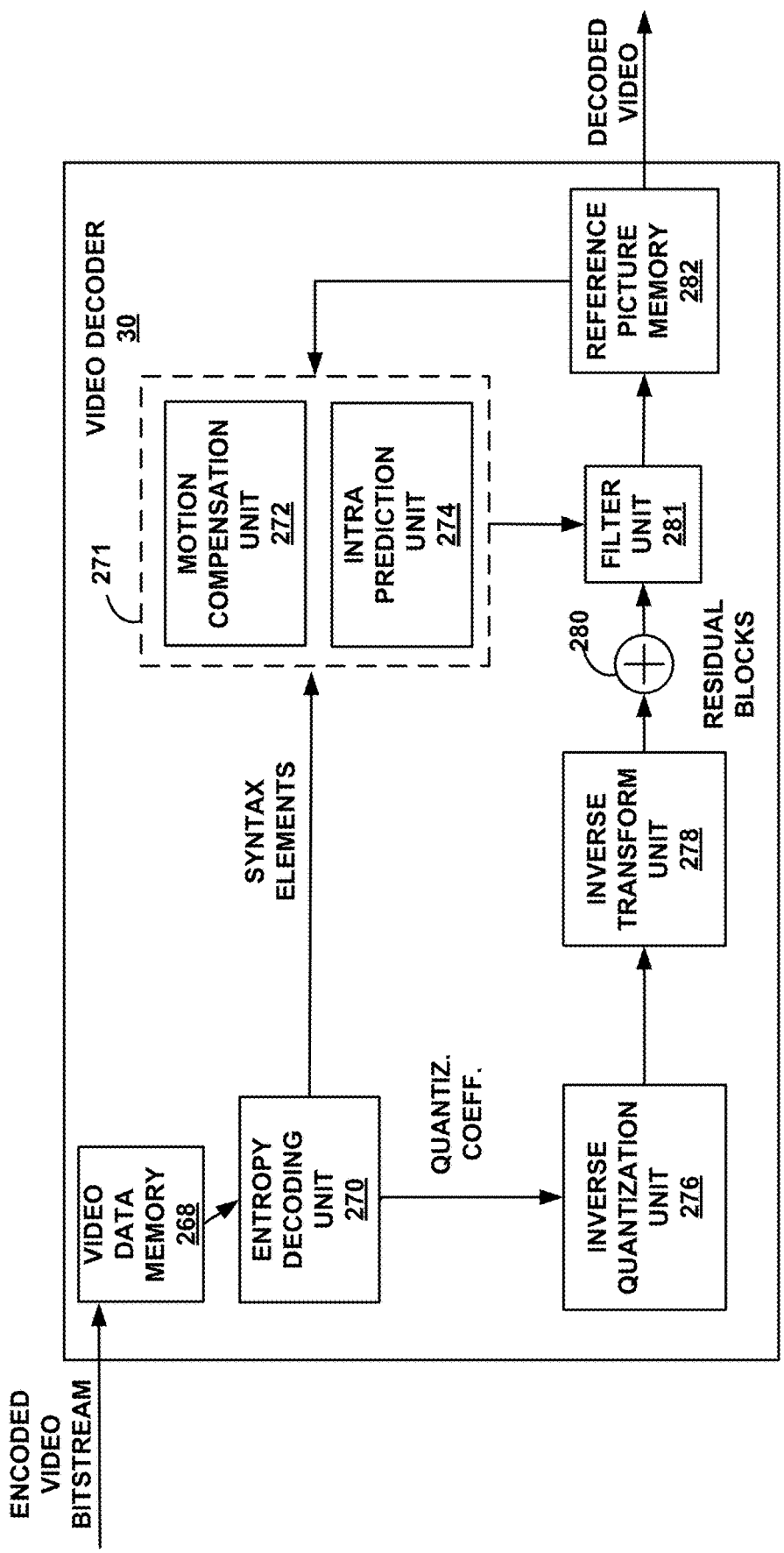
FIG. 15 is a block diagram illustrating an example of a video decoder configured to perform one or more of the techniques described herein.

FIG. 15 is a block diagram illustrating an example video decoder 30 that is configured to implement the techniques of this disclosure. FIG. 15 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 15 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 15 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 15, video decoder 30 includes an entropy decoding unit 270, video data memory 268, a prediction processing unit 271, an inverse quantization unit 276, an inverse transform unit 278, a reconstruction unit 280, a filter unit 281, and a reference picture memory 282. Prediction processing unit 271 includes a motion compensation unit 272 and an intra-prediction processing unit 274. In other examples, video decoder 30 may include more, fewer, or different functional components.

Video data memory 268 may store encoded video data, such as an encoded video bitstream, to be decoded by the components of video decoder 30. The video data stored in video data memory 268 may be obtained, for example, from computer-readable medium 16, e.g., from a local video source, such as a camera, via wired or wireless network communication of video data, or by accessing physical data storage media. Video data memory 268 may form a coded picture buffer (CPB) that stores encoded video data from an encoded video bitstream. Reference picture memory 282 may also be referred to as a reference picture memory. Reference picture memory 282 stores reference video data for use in decoding video data by video decoder 30, e.g., in intra- or inter-coding modes, or for output. Video data memory 268 and reference picture memory 282 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 268 and reference picture memory 282 may be provided by the same memory device or separate memory devices. In various examples, video data memory 268 may be on-chip with other components of video decoder 30, or off-chip relative to those components. Video data memory 268 may be the same as or part of storage media 28 of FIG. 1.

Video data memory 268 receives and stores encoded video data (e.g., NAL units) of a bitstream. Entropy decoding unit 270 may receive encoded video data (e.g., NAL units) from video data memory 268 and may parse the NAL units to obtain syntax elements. Entropy decoding unit 270 may entropy decode entropy-encoded syntax elements in the NAL units. Prediction processing unit 271, inverse quantization unit 276, inverse transform unit 278, reconstruction unit 280, and filter unit 281 may generate decoded video data based on the syntax elements extracted from the bitstream. Entropy decoding unit 270 may perform a process generally reciprocal to that of entropy encoding unit 256.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 276 may inverse quantize, i.e., de-quantize, coefficient blocks associated with the TU. After inverse quantization unit 276 inverse quantizes a coefficient block, inverse transform unit 278 may apply one or more inverse transforms to the coefficient block in order to generate a residual block associated with the TU. For example, inverse transform unit 278 may apply an inverse DCT, an inverse integer transform, an inverse Karhunen-Loeve transform (KLT), an inverse rotational transform, an inverse directional transform, or another inverse transform to the coefficient block.

In accordance with the techniques of this disclosure, inverse transform unit 278 may implement the techniques described elsewhere in this disclosure. For example, inverse transform unit 278 may, for a first block of video data, determine that a first inverse transform process of a plurality of inverse transform processes is to be applied to the first block. Inverse transform unit 278 may then apply the first inverse transform process to first transform coefficients of the first block to generate a first residual and decode the first residual to produce a first decoded block. In some instances, the first inverse transform process is a discrete trigonometrical transform matrix. In some such instances, each inverse transform process of the plurality of inverse transform processes is a discrete trigonometrical inverse transform matrix. In some instances, the first inverse transform process is one of a DCT-2 matrix, a DCT-3 matrix, a DST-2 matrix, or a DST-3 matrix. For example, the first inverse transform process may be the DST-3 matrix as the inverse transform process.

For a second block of video data, inverse transform unit 278 may determine that a second inverse transform process is to be applied to the second block, where the second inverse transform process includes the first inverse transform process and at least one of a pre-adjustment operation or a post-adjustment operation. Inverse transform unit 278 may apply the first inverse transform process and the at least one of the pre-adjustment operation or the post-adjustment operation to second transform coefficients of the second block to generate a second residual. If the pre-adjustment operation is applied, inverse transformation processing unit 156 applies the pre-adjustment operation prior to applying the first inverse transform process. If the post-adjustment operation is applied, inverse transformation processing unit 156 applies the post-adjustment operation after applying the first inverse transform process. Video decoder 30 may decode the second residual to produce a second decoded block. Video decoder 30 may then proceed to decode the video data based at least in part on the first decoded block and the second decoded block.

In essence, the second residual is approximately equal to a residual resulting from applying a more complex transform process to the second transform coefficients of the second block. In this example, the DST-3 inverse transform process, in combination with at least one of a pre- or post-adjustment process, may result in a residual that is approximately equal to a residual that would have resulted from applying the DST-4 inverse transform process.

In some instances, the first inverse transform process and the at least one of the pre-adjustment operation or the post-adjustment operation each are a respective sparse matrix, as defined above. In some examples, the sparse matrix of the first inverse transform process is a band diagonal matrix. In other examples, the sparse matrix of the first inverse transform process is a block diagonal matrix. In some examples, the at least one of the pre-adjustment operation or the post-adjustment operation are a respective set of one or more Givens rotations.

In determining which inverse transform process to apply to the second transform coefficients, inverse transform unit 278 may analyze index values. For instance, inverse transform unit 278 may read a first index value that indicates which transform process to apply to the second transform coefficients and determine that a value of the first index indicates that the first inverse transform is to be applied to the second coding block. Further, inverse transform processing unit 157 may read a second index value that indicates whether pre- and/or post-adjustment operations are to be applied to the second coding block in addition to the inverse transform process and determine that a value of the second index indicates that the at least one of the pre-adjustment operation and the post-adjustment operation is to be applied to the second block in addition to the first inverse transform.

In some examples, the transform processes may be implemented as separable fixed passes, meaning that the same transform is applied during all of the one-dimensional transformations, although the transforms may change between the vertical and horizontal passes. In such examples, the first block may be a first coding tree unit, and the second block may be a second, different coding tree unit.

In other examples, the transform processes may be implemented as separable variable passes, where each row (for horizontal passes) or column (for vertical passes) of coding units, or pairs of rows or columns, within a single coding tree unit may use different transforms. In such examples, the first block may be a first coding unit in a first row or column of a coding tree unit, and the second block may be a second coding unit in a different row or column of the same coding tree unit. In the example where pairs of rows/columns use the same transform process, inverse transform unit 278 may determine that the first inverse transform process and the at least one of the pre-adjustment operation or the post-adjustment operation is to be applied to a third coding unit, where the third coding unit is in a third row of the coding tree unit that is contiguous with the second row. Inverse transform unit 278 may then apply the first inverse transform process and the at least one of the pre-adjustment operation or the post-adjustment operation to third transform coefficients of the third coding unit to generate a third residual, decode the third residual to produce a third decoded coding unit, and decode the video data based at least in part on the third decoded block.

If a PU is encoded using intra prediction, intra-prediction processing unit 274 may perform intra prediction to generate predictive blocks of the PU. Intra-prediction processing unit 274 may use an intra prediction mode to generate the predictive blocks of the PU based on samples spatially-neighboring blocks. Intra-prediction processing unit 274 may determine the intra prediction mode for the PU based on one or more syntax elements obtained from the bitstream.

If a PU is encoded using inter prediction, entropy decoding unit 270 may determine motion information for the PU. Motion compensation unit 272 may determine, based on the motion information of the PU, one or more reference blocks. Motion compensation unit 272 may generate, based on the one or more reference blocks, predictive blocks (e.g., predictive luma, Cb and Cr blocks) for the PU.

Reconstruction unit 280 may use transform blocks (e.g., luma, Cb and Cr transform blocks) for TUs of a CU and the predictive blocks (e.g., luma, Cb and Cr blocks) of the PUs of the CU, i.e., either intra-prediction or inter-prediction data, as applicable, to reconstruct the coding blocks (e.g., luma, Cb and Cr coding blocks) for the CU. For example, reconstruction unit 280 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 281 may perform a deblocking operation to reduce blocking artifacts associated with the coding blocks of the CU. Video decoder 30 may store the coding blocks of the CU in reference picture memory 282. Reference picture memory 282 may provide reference pictures for subsequent motion compensation, intra prediction, and presentation on a display device, such as display device 32 of FIG. 1. For instance, video decoder 30 may perform, based on the blocks in reference picture memory 282, intra prediction or inter prediction operations for PUs of other CUs.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

Figure 16:
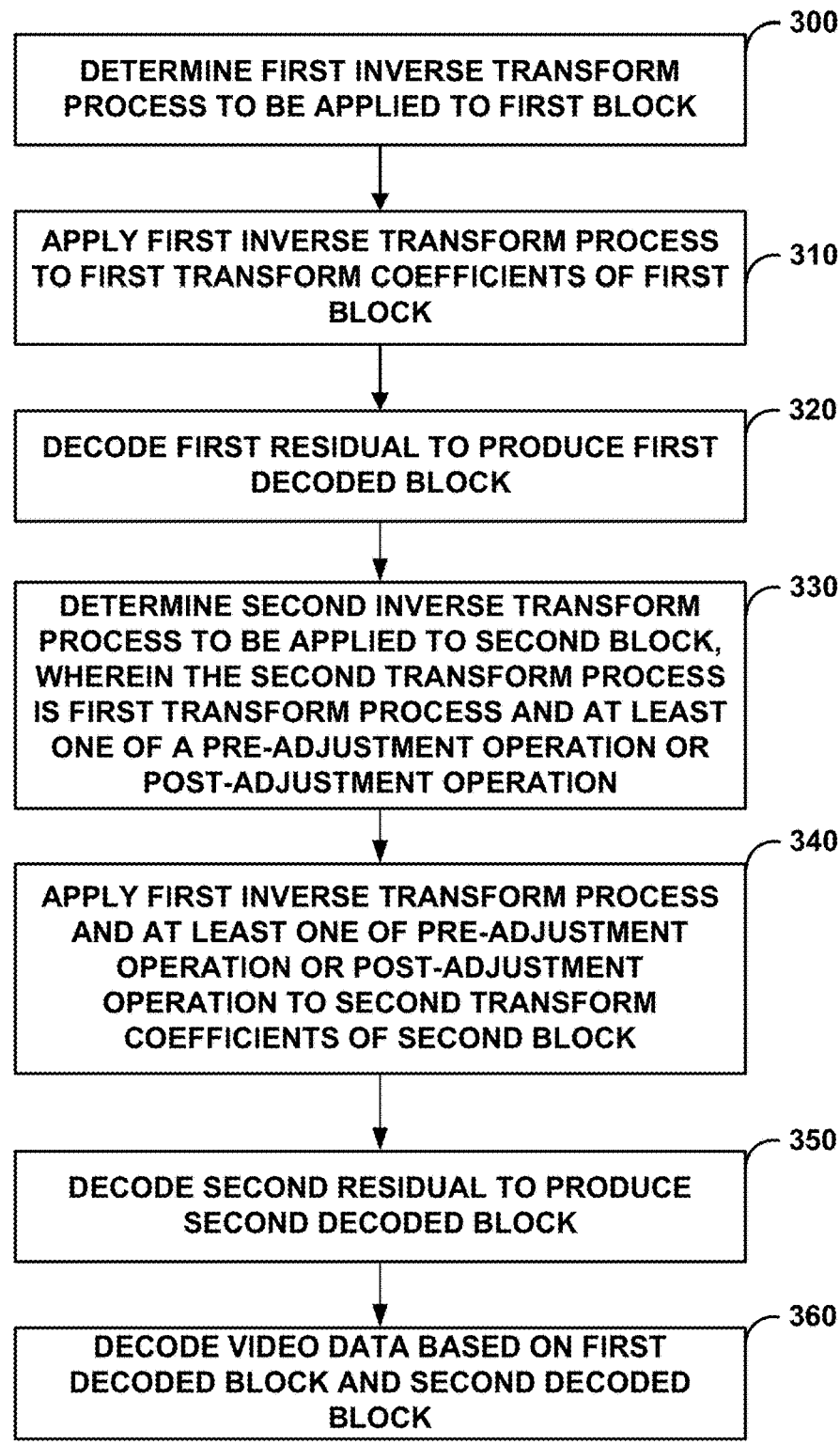
FIG. 16 is a flow diagram illustrating a first example decoding of video data that may implement techniques described in this disclosure.

FIG. 16 is a flow diagram illustrating a first example decoding of video data that may implement techniques described in this disclosure. The example techniques of FIG. 13 may be performed by video decoder 30. In the example of FIG. 13, a decoder (e.g., video decoder 30) may determine that a first inverse transform process of a plurality of inverse transform processes is to be applied to a first block of a plurality of blocks of video data (300). Video decoder 30 may then apply the first inverse transform process to first transform coefficients of the first block to generate a first residual (310). Video decoder 30 may decode the first residual to produce a first decoded block (320). For a second block of the plurality of blocks of video data, video decoder 30 may determine that a second inverse transform process is to be applied to a second block of the plurality of blocks of video data, where the second inverse transform process includes the first inverse transform process and at least one of a pre-adjustment operation or a post-adjustment operation (330). Video decoder 30 may apply the first inverse transform process and the at least one of the pre-adjustment operation or the post-adjustment operation to second transform coefficients of the second block to generate a second residual (340). If the pre-adjustment operation is applied, video decoder 30 applies the pre-adjustment operation prior to applying the first inverse transform process. If the post-adjustment operation is applied, video decoder 30 applies the post-adjustment operation after applying the first inverse transform process. Video decoder 30 may decode the second residual to produce a second decoded block (350). Video decoder 30 may then proceed to decode the video data based at least in part on the first decoded block and the second decoded block (360).

In some examples, the transform processes may be implemented as separable fixed passes, meaning that the same transform is applied during all of the one-dimensional transformations, although the transforms may change between the vertical and horizontal passes. In such examples, the first block may be a first coding tree unit, and the second block may be a second, different coding tree unit. In other examples, the transform processes may be implemented as separable variable passes, where each row (for horizontal passes) or column (for vertical passes) of coding units, or pairs of rows or columns, within a single coding tree unit may use different transforms. In such examples, the first block may be a first coding unit in a first row or column of a coding tree unit, and the second block may be a second coding unit in a different row or column of the same coding tree unit.

Figure 17:
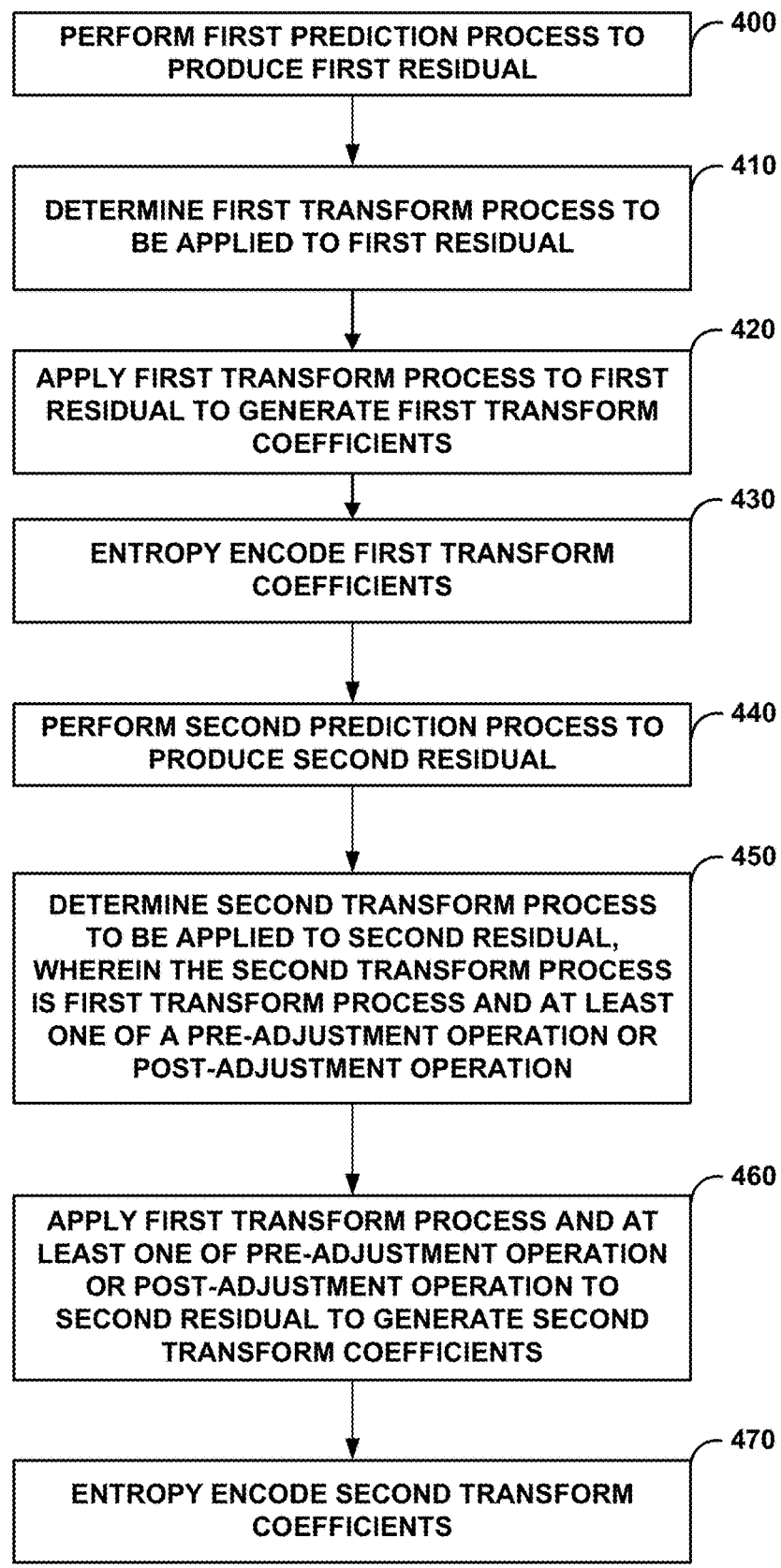
FIG. 17 is a flow diagram illustrating a first example encoding of video data that may implement techniques described in this disclosure.

FIG. 17 is a flow diagram illustrating a first example encoding of video data that may implement techniques described in this disclosure. The example techniques of FIG. 14 may be performed by video encoder 20. In the example of FIG. 14, an encoder (e.g., video encoder 20) may perform a first prediction process for a first block of video data to produce a first residual (400). Video encoder 20 may determine that a first transform process of a plurality of transform processes is to be applied to the first block (410). Video encoder 20 may then apply the first transform process to the first residual to generate first transform coefficients for the first block of video data (420). Video encoder 20 may then entropy encode the first transform coefficients (430). Video encoder 20 may perform a second prediction process for a second block of video data to produce a second residual (440). Video encoder 20 may determine that a second transform process is to be applied to the second block (450). The second transform process may include the first transform process and at least one of a first pre-adjustment operation or a first post-adjustment operation to apply to the second residual in addition to the first transform process. Video encoder 20 may apply the first transform process and at least one of the first pre-adjustment operation or the first post-adjustment operation to the second residual to generate second transform coefficients for the second block of video data (460). If the first pre-adjustment operation is applied, video encoder 20 applies the first pre-adjustment operation prior to applying the first transform process. If the first post-adjustment operation is applied, video encoder 20 applies the first post-adjustment operation after applying the first transform process. Video encoder 20 may then proceed to entropy encode the second transform coefficients (470).

In some examples, the transform processes may be implemented as separable fixed passes, meaning that the same transform is applied during all of the one-dimensional transformations, although the transforms may change between the vertical and horizontal passes. In such examples, the first block may be a first coding tree unit, and the second block may be a second, different coding tree unit. In other examples, the transform processes may be implemented as separable variable passes, where each row (for horizontal passes) or column (for vertical passes) of coding units, or pairs of rows or columns, within a single coding tree unit may use different transforms. In such examples, the first block may be a first coding unit in a first row or column of a coding tree unit, and the second block may be a second coding unit in a different row or column of the same coding tree unit.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of decoding video data comprising:
determining that a first inverse transform process of a plurality of inverse transform processes is to be applied to a first block of a plurality of blocks of video data, wherein the first inverse transform process comprises one of a DCT-2 matrix, a DCT-3 matrix, a DST-2 matrix, or a DST-3 matrix;
applying the first inverse transform process to first transform coefficients of the first block to generate a first residual;
decoding the first residual to produce a first decoded block; determining that a second inverse transform process is to be applied to a second block of the plurality of blocks of video data, wherein the second inverse transform process comprises the first inverse transform process and at least one of a pre-adjustment operation or a post-adjustment operation;
applying the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process, and wherein the application of the first inverse transform process and the at least one of the pre-adjustment operation or the post-adjustment operation approximates an inverse transform process of a type different from the first inverse transform process;
decoding the second residual to produce a second decoded block; and
decoding the video data based at least in part on the first decoded block and the second decoded block.

2. The method of claim 1, further comprising:
determining that the first inverse transform is to be applied to the second coding block based on a value of a first index; and
determining that the at least one of the pre-adjustment operation and the post-adjustment operation is to be applied to the second block in addition to the first inverse transform based on a value of a second index.

3. The method of claim 1, wherein each inverse transform process of the plurality of inverse transform processes comprises a discrete trigonometrical transform matrix.

4. The method of claim 1, wherein the second residual is approximately equal to a residual resulting from applying a second inverse transform process from the plurality of inverse transform processes to the second transform coefficients of the second block.

5. The method of claim 1, wherein the first inverse transform process and the at least one of the pre-adjustment operation or the post-adjustment operation each comprise a respective sparse matrix.

6. The method of claim 5, wherein the sparse matrix of the first inverse transform process comprises a band diagonal matrix.

7. The method of claim 5, wherein the sparse matrix of the first inverse transform process comprises a block diagonal matrix.

8. The method of claim 1, wherein the at least one of the pre-adjustment operation or the post-adjustment operation comprise a set of one or more Givens rotations.

9. The method of claim 1, further comprising:
receiving the video data at a receiver of a wireless communication device;
storing the video data in a memory of the wireless communication device; and
processing the video data on one or more processors of the wireless communication device.

10. The method of claim 9, wherein the wireless communication device comprises a telephone handset and wherein receiving the video data at the receiver of the wireless communication device comprises demodulating, according to a wireless communication standard, a signal comprising the video data.

11. The method of claim 1, wherein the first block of video data comprises a first coding unit in a first row of a coding tree unit, wherein the second block of video data comprises a second coding unit in a second row of the coding tree unit, and wherein the first row is different than the second row.

12. The method of claim 1, wherein the first block of video data comprises a first coding unit in a first column of a coding tree unit, wherein the second block of video data comprises a second coding unit in a second column of the coding tree unit, and wherein the first column is different than the second column.

13. The method of claim 1, wherein the first block of video data comprises a first coding unit in a first row of a coding tree unit, wherein the second block of video data comprises a second coding unit in a second row of the coding tree unit, wherein the first row is different than the second row, wherein the method further comprises:
determining that the first inverse transform process and the at least one of the pre-adjustment operation or the post-adjustment operation is to be applied to a third coding unit, wherein the third coding unit is in a third row of the coding tree unit, wherein the second row and the third row are contiguous rows;
applying the first inverse transform process and the at least one of the pre-adjustment operation or the post-adjustment operation to third transform coefficients of the third coding unit to generate a third residual decoding the third residual to produce a third decoded coding unit; and
decoding the video data based at least in part on the third decoded block.

14. The method of claim 1, wherein the first block of video data comprises a first coding tree unit, and wherein the second block of video data comprises a second coding tree unit different than the first coding tree unit.

15. A video decoding device comprising:
a memory configured to store video data; and
one or more processors implemented in circuitry and configured to:
determine that a first inverse transform process of a plurality of inverse transform processes is to be applied to a first block of a plurality of blocks of video data, wherein the first inverse transform process comprises one of a DCT-2 matrix, a DCT-3 matrix, a DST-2 matrix, or a DST-3 matrix;
apply the first inverse transform process to first transform coefficients of the first block to generate a first residual;
decode the first residual to produce a first decoded block;
determine that a second inverse transform process is to be applied to a second block of the plurality of blocks of video data, wherein the second inverse transform process comprises the first inverse transform process and at least one of a pre-adjustment operation or a post-adjustment operation;
apply the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process, and wherein the application of the first inverse transform process and the at least one of the pre-adjustment operation or the post-adjustment operation approximates an inverse transform process of a type different from the first inverse transform process;
decode the second residual to produce a second decoded block; and
decode the video data based at least in part on the first decoded block and the second decoded block.

16. The video decoding device of claim 15, wherein the one or more processors are further configured to:
determine that the first inverse transform is to be applied to the second coding block based on a value of a first index; and
determine that the at least one of the pre-adjustment operation and the post-adjustment operation is to be applied to the second block in addition to the first inverse transform based on a value of a second index.

17. The video decoding device of claim 15, wherein the second residual is approximately equal to a residual resulting from applying a second inverse transform process from the plurality of inverse transform processes to the second transform coefficients of the second block.

18. The video decoding device of claim 15, wherein the first inverse transform process and the at least one of the pre-adjustment operation or the post-adjustment operation each comprise a respective sparse matrix, wherein the sparse matrix of the first inverse transform process comprises one of a band diagonal matrix or a block diagonal matrix.

19. The video decoding device of claim 15, wherein the at least one of the pre- adjustment operation or the post-adjustment operation comprise a set of one or more Givens rotations.

20. The video decoding device of claim 15, wherein the device comprises a wireless communication device, further comprising a receiver configured to receive encoded video data.

21. The video decoding device of claim 20, wherein the wireless communication device comprises a telephone handset and wherein the receiver is configured to demodulate, according to a wireless communication standard, a signal comprising the encoded video data.

22. The video decoding device of claim 20, wherein the first block of video data comprises a first coding unit in a first row of a coding tree unit, wherein the second block of video data comprises a second coding unit in a second row of the coding tree unit, and wherein the first row is different than the second row.

23. The video decoding device of claim 20, wherein the first block of video data comprises a first coding unit in a first column of a coding tree unit, wherein the second block of video data comprises a second coding unit in a second column of the coding tree unit, and wherein the first column is different than the second column.

24. The video decoding device of claim 20, wherein the first block of video data comprises a first coding unit in a first row of a coding tree unit, wherein the second block of video data comprises a second coding unit in a second row of the coding tree unit, wherein the first row is different than the second row, wherein the one or more processors are further configured to:
   determine that the first inverse transform process and the at least one of the pre- adjustment operation or the post-adjustment operation is to be applied to a third coding unit, wherein the third coding unit is in a third row of the coding tree unit, wherein the second row and the third row are contiguous rows;
   apply the first inverse transform process and the at least one of the pre-adjustment operation or the post-adjustment operation to third transform coefficients of the third coding unit to generate a third residual decode the third residual to produce a third decoded coding unit; and
   decode the video data based at least in part on the third decoded block.

25. The video decoding device of claim 20, wherein the first block of video data comprises a first coding tree unit, and wherein the second block of video data comprises a second coding tree unit different than the first coding tree unit.

26. The video decoding device of claim 15, further comprising:
   a display configured to display the decoded video data.

27. A non-transitory computer-readable storage medium having stored thereon computer-executable instructions that, when executed, cause one or more processors of a video decoding device to:
   determine that a first inverse transform process of a plurality of inverse transform processes is to be applied to a first block of a plurality of blocks of video data, wherein the first inverse transform process comprises one of a DCT-2 matrix, a DCT-3 matrix, a DST-2 matrix, or a DST-3 matrix;
   apply the first inverse transform process to first transform coefficients of the first block to generate a first residual;
   decode the first residual to produce a first decoded block;
   determine that a second inverse transform process is to be applied to a second block of the plurality of blocks of video data, wherein the second inverse transform process comprises the first inverse transform process and at least one of a pre-adjustment operation or a post-adjustment operation;
   apply the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process, and wherein the application of the first inverse transform process and the at least one of the pre-adjustment operation or the post-adjustment operation approximates an inverse transform process of a type different from the first inverse transform process;
   decode the second residual to produce a second decoded block; and
   decode the video data based at least in part on the first decoded block and the second decoded block.

28. An apparatus for decoding video data, the apparatus comprising:
   means for determining that a first inverse transform process of a plurality of inverse transform processes is to be applied to a first block of a plurality of blocks of video data, wherein the first inverse transform process comprises one of a DCT-2 matrix, a DCT-3 matrix, a DST-2 matrix, or a DST-3 matrix;
   means for applying the first inverse transform process to first transform coefficients of the first block to generate a first residual;
   means for decoding the first residual to produce a first decoded block;
   means for determining that a second inverse transform process is to be applied to a second block of the plurality of blocks of video data, wherein the second inverse transform process comprises the first inverse transform process and at least one of a pre-adjustment operation or a post-adjustment operation;
   means for applying the first inverse transform process and the at least one of the pre-adjustment operation or the post-adjustment operation to second transform coefficients of the second block to generate a second residual, wherein the pre-adjustment operation, if applied, is applied prior to applying the first inverse transform process, and wherein the post-adjustment operation, if applied, is applied after applying the first inverse transform process, and wherein the application of the first inverse transform process and the at least one of the pre-adjustment operation or the post-adjustment operation approximates an inverse transform process of a type different from the first inverse transform process;
   means for decoding the second residual to produce a second decoded block; and
   means for decoding the video data based at least in part on the first decoded block and the second decoded block.

* * * * *